United States Patent [19]

Brubaker

[11] Patent Number: 4,719,361

[45] Date of Patent: Jan. 12, 1988

[54] MOBILE, OFF-ROAD, HEAVY-DUTY HAULAGE VEHICLE

[75] Inventor: Richard R. Brubaker, Peoria, Ill.

[73] Assignee: Dresser Industries, Inc., Dallas, Tex.

[21] Appl. No.: 897,598

[22] Filed: Aug. 18, 1986

[51] Int. Cl.$^4$ .............................................. B60L 11/06
[52] U.S. Cl. ........................................ 290/45; 290/14
[58] Field of Search .............. 290/14, 17, 45; 322/18, 322/19, 21, 28

[56] References Cited

U.S. PATENT DOCUMENTS

| | | | |
|---|---|---|---|
| 3,492,555 | 1/1970 | Friend .................................. | 318/149 |
| 3,771,821 | 11/1973 | Rist et al. ........................... | 322/18 X |
| 3,953,775 | 4/1976 | Friend et al. ..................... | 290/14 X |
| 4,292,531 | 9/1981 | Williamson ........................ | 290/14 |
| 4,305,254 | 12/1981 | Kawakatsu et al. .............. | 290/45 X |
| 4,547,678 | 10/1985 | Metzner et al. .................. | 290/45 X |

FOREIGN PATENT DOCUMENTS 2076757 12/1981 United Kingdom .................. 290/45

*Primary Examiner*—William M. Shoop, Jr.
*Assistant Examiner*—W. E. Duncanson, Jr.
*Attorney, Agent, or Firm*—Hubbard, Thurman, Turner & Tucker

[57] ABSTRACT

An off-road, heavy duty, haulage vehicle includes a diesel engine driving an alternator (generator) for producing electrical power for motorized rear wheels. An alternator field converter is electrically connected to the alternator and an armature converter and a motor field converter are electrically connected to the two motors of the motorized rear wheels. A computerized control center includes control systems including an alternator field converter control system, a motor field control system, and a vehicle operation and maintenance control system. Tertiary windings are used as a source of excitation and the phase angle controlled armature converter is used in conjunction with alternator voltage control system for holding the alternator at an increment of voltage higher than the motors but not at a constant maximum voltage level. Other operating functions are under control of an additional control system for providing warnings of impending trouble, detection of system faults and records of operating information for diagnostic purposes and maintenance and repair.

35 Claims, 29 Drawing Figures

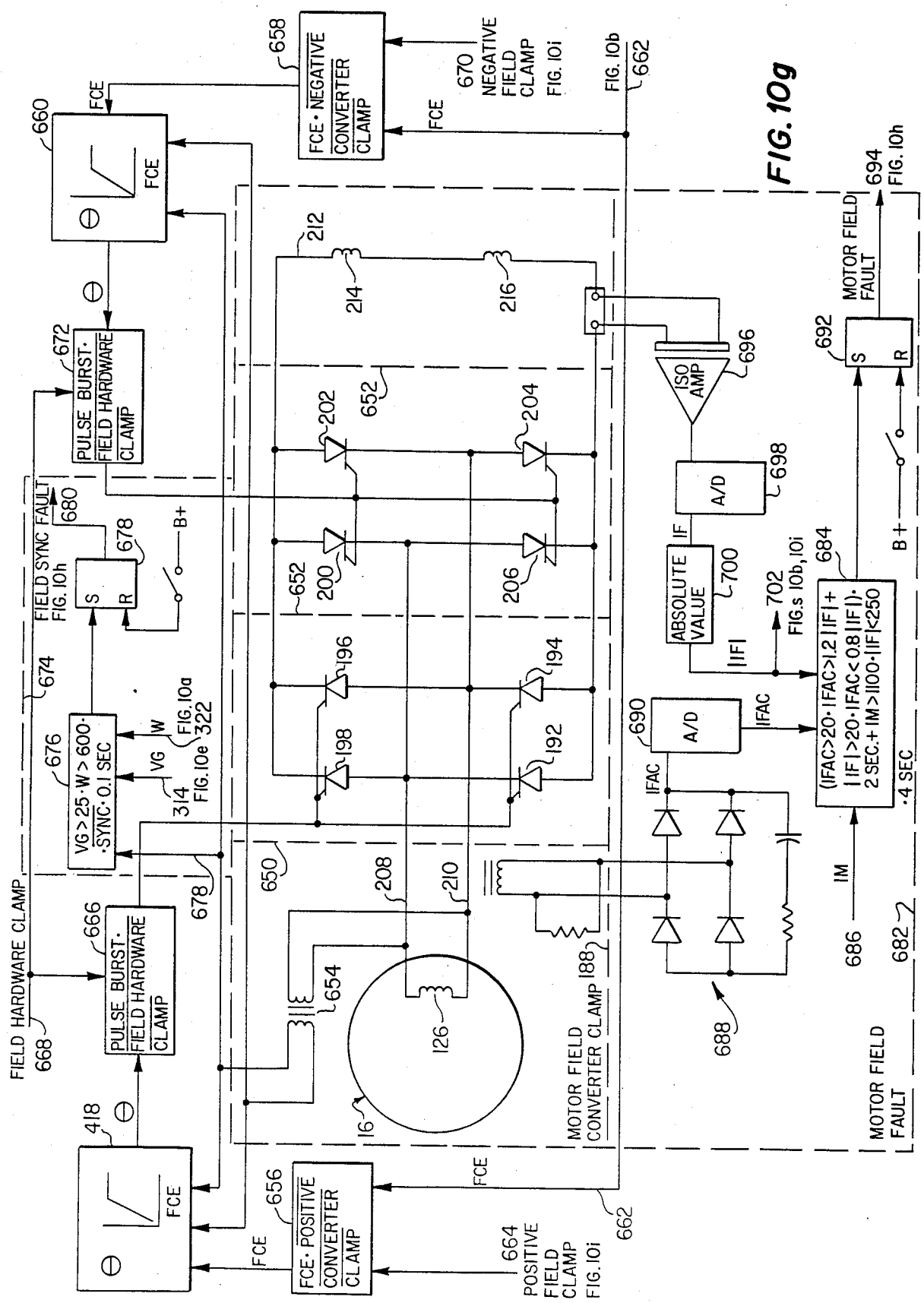

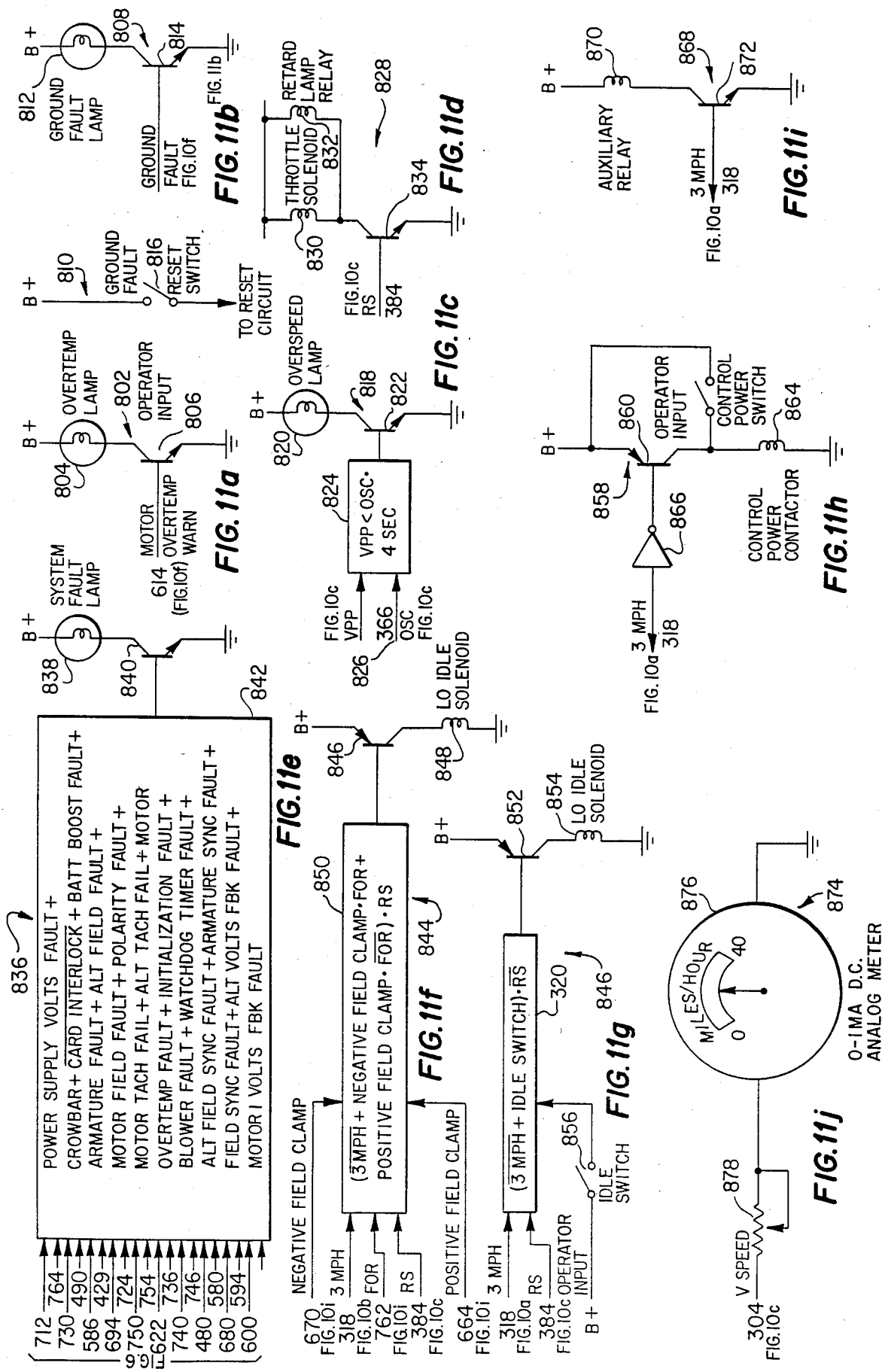

MOBILE, OFF-ROAD, HEAVY-DUTY HAULAGE VEHICLE

BACKGROUND OF THE INVENTION

This invention relates to mobile heavy-duty equipment and more particularly to an improved off-road, heavy-duty haulage vehicle, hereinafter referred to as a "vehicle".

Historically, off-road, heavy-duty work vehicles such as trucks have included front wheels, motorized rear wheels, a chassis or frame, front and rear suspension systems connecting the wheels to the frame, a body including a motor compartment and cab connected to chassis, a diesel electric traction system attached to the frame inside the motor compartment and connected to the motors of the motorized rear wheels, vehicle operating controls mounted within the cab for an operator, and a bed attached to the frame for transporting a load.

In the past, diesel electric traction systems (having a diesel engine driving a generator or rectified alternator) have used direct current series motors as traction motors. Control of voltage, amperage, and load on the diesel engine has been accomplished by regulating the generator field. Traction motors were used also to retard the truck and were excited by the generator; excitation was controlled by the generator field.

More recently, two distinct separately excited systems have been used. One of these uses tertiary windings placed on the armature of the rectified alternator to supply excitation both for the motor fields and for the alternator field. The second maintains excitation of the alternator field and taps the main windings for field supply, both for the alternator field and for the motor field. Excitation levels are controlled by SCR bridges.

In the first system, using tertiary windings as a source of excitation, the alternator field is still used to limit volts and amps and regulate power to the motor armatures. Further, the direct motor field is controlled by an alternating current rectifier bridge. The tertiary windings are placed on the armature of the alternator in such a way that they are coupled magnetically with the main armature current as well as air gap flux, thus, creating the ability to generate currents at low motor speeds when counter emf of the motors is low, and air gap flux is very low. Motor field current in these systems is regulated proportionally to armature current with added provision for weakening the motor field at high motor speeds.

The disadvantages of this system are as follows: as armature current tends to change rapidly compared to motor field which is highly inductive, poor commutation and brush life result from the motor field always following the motor armature current; initial response of the system is slow because armature current must buildup before any field supply is available; and large contactors are still required to interrupt the power circuit, and response time is slowed by switching times of the contactors.

In the second system, a phase angle controlled SCR armature converter is used to control armature current and SCR bridges are used to control field levels. This system has typically been used with constant speed engines.

The disadvantages of systems tapping the main winding for excitation are as follows: excitation currents in the alternator are very high at low motor speeds when high motor armature amps are required; the leakage reactances and armature reaction of the armature winding create high excitation current demand at high line ampere levels in the alternator; the necessity to maintain high line voltage in order to supply motor field amperes adds significant excitation requirement and increases thermal losses in the field of the alternator; the high line voltages at low motor speeds cause the armature converter to fire for only a small portion of the total cycle and thus causes inefficient use of the SCRs; and the small angle of conduction at high currents in the armature circuit causes high rms currents in the armature of the motor which have a negative impact on motor thermal capacity and commutation.

The present off-road, heavy-duty vehicles also suffer from excessive maintenance and repair requirements, and from response times which increase both operating costs and safety risks.

The advantages of the present invention over the prior art devices are that a programmable controller regulates all power control functions including the matching of engine capability to power and speed requirements of the vehicle; the inputs to the controller are dual to actuate events based on the highest speed wheel and the controller provides a signal for controlling speedometer indications and making recorder measurements.

Thus, in response to operator signals, main contactors set up appropriate circuits between the alternator and the drive motors—before excitation causes generation of power. Forward or Reverse propulsion circuits result from the corresponding position of the operator's selector lever and acceleration and speed is maintained by a foot pedal. Excitation of the main alternator is modulated by the control system in response to the foot pedal operation to provide power proportional to engine speed. The load increases smoothly as engine speed increases to insure maximum fuel economy and engine efficiency. Engine bogging from overloading is prevented and at full throttle, the control systems maintains full governed engine speed and constant horsepower over a wide range of vehicle speeds.

As vehicle speed increases, the control system triggers a series of automatic events. For example, anti-reversal occurs at vehicle speeds over three MPH. Further, in the retard mode, the wheel drive motors act as generators whose power is fed back to the A.C. generator to slow the diesel engine to provide excellent retarding effort at low speed without the need for large expensive contactors.

Another advantage example, is the complete monitoring of the system by the controller which signals faults and impending problems, shuts down the power plant when problems are indicated which will result in serious damage to the system, and records the results of the monitoring operation for use in troubleshooting and regular maintenance.

SUMMARY OF THE INVENTION

Accordingly, it is an object of the invention to provide an improved motorized vehicle which is easy to operate, maintain and repair.

Another object of the invention is to provide an improved motorized vehicle with a computerized diagnostic capability to reduce substantially the down time of the equipment for maintenance and repair and their cost.

Still another object of the invention is to provide an improved motorized vehicle design with safety features.

Yet another object of the invention is to provide in the diesel electric traction system for the close tracking of the armature and field currents one to the other.

Still yet another object of the invention is to improve the vehicle's response time to control actions.

A further object of the invention is to substantially lower the excitation requirements of the alternator field.

Still a further object of the invention is to improve the efficiency of the SCRs.

Yet a further object of the invention is to improve the ripple or rms content in the motor armature.

Also an object of the invention is to improve the low speed retarding of the vehicle by permitting regeneration of power into the diesel engine.

Briefly stated the invention comprises an improved off-road, heavy-duty, haulage vehicle (hereinafter vehicle) having a diesel electric traction system and a computerized control system for controlling and monitoring the operation of the vehicle including enabling the use of the tertiary windings of the alternator as a source of self excitation, the use of the phase angle controlled armature converter in conjunction with alternator voltage control to hold the alternator at an increment of overvoltage higher than the motor voltage up to a constant maximum voltage level, and the use of a motor field converter for forward propel and reverse retarding and reverse propel and forward retarding. Another feature of the invention is a supplemental computerized control system for use in diagnosing maintenance and repair problems and system self test.

BRIEF DESCRIPTION OF THE DRAWINGS

The novel features believed to be characteristic of this invention are set forth in the appended claims. The invention itself, however, as well as other objects and advantages thereof may best be understood by reference to the following detailed description of an illustrative embodiment when read in conjunction with the accompanying drawings in which:

FIGS. 10a–10i constitute a schematic drawing partly in block form of the diesel electric traction system and control system.

FIGS. 11a–11j are partial schematics of the truck output interface circuits.

DESCRIPTION OF THE PREFERRED EMBODIMENT

Figure 1:
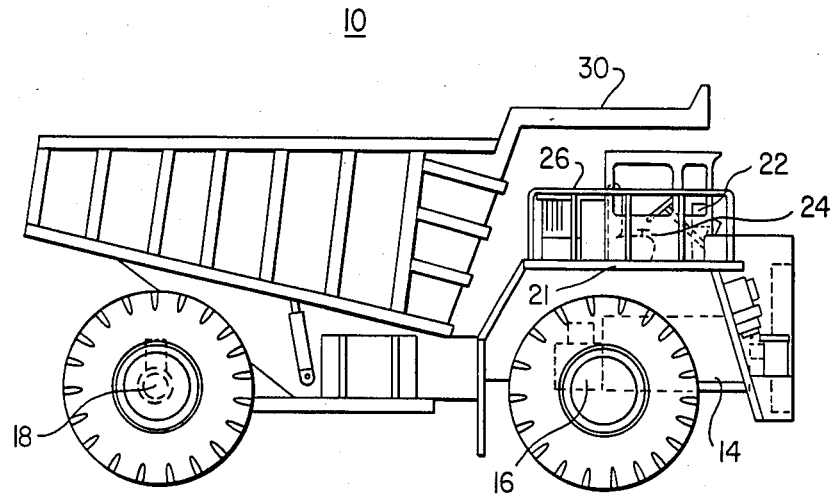
FIG. 1 is a side view of the vehicle showing in dotted lines the locations of the components for the diesel electric traction system.
Figure 2:
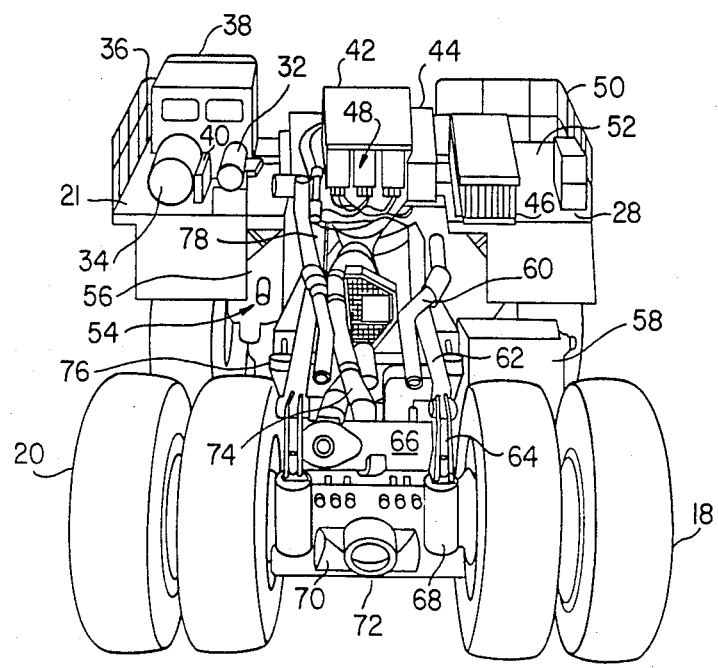
FIG. 2 is a rear view of the vehicle with the bed removed for disclosing additional vehicle features.

The off-road, heavy-duty, mobilized vehicle (hereinafter vehicle) (FIG. 1) as shown comprises, for example, a 170-190 ton dump truck 10 including a combustion engine preferably a diesel electric traction system 12 (FIG. 3) with computerized controls. The diesel electric traction system with controls includes a frame mounted diesel engine 14 (FIG. 1) such as, for example, a Cummins diesel KTA-3067-C operatively connected to drive a main power alternator (generator) 16 with cooling blower. A suitable alternator is, for example, a G.E. GTA-22D Alternator General Electric. The alternator 16 is electrically connected to motorized rear wheels 18 and 20 (FIG. 2). The motorized wheels include, for example, two General Electric motors, GE Model 776, connected in series and air brakes. Control panels 22 (FIG. 1), hereinafter described, are mounted on the cab's dashboard. Also in the cab is an operator's console 24, located by the side of the seat for the forward, neutral and reverse electrical control switch stick and a footfeed type electrical switch type throttle (not shown). A control center cabinet 26 is located on the deck for controlling the operations hereinafter described.

Other important features of the vehicle (FIG. 2) include a rubber mounted deck structure 21 which rides high above ground level for cleaner air conditions. The rubber mount isolates substantially the deck from vibrations. The large deck provides: room for an uncluttered arrangement of components without destroying operator visibility, ample space for component placement, and ample space for component servicing. Full overhead protection of the components on the deck, the cab and the service personnel is provided by the canopy 30 (FIG. 1).

The deck located components include an auxiliary/emergency air tank 32 (FIG. 2) for front brakes, with an emergency relay valve attached and a main air system supply tank 34. An air pressure failure is detected at the control center and the emergency tank 22 automatically switched in. Big (7"×30", 17 cm×76 cm) rear view mirrors 36 with heavy duty support provide a substantial rear view.

The cab 38 is mounted to the far left for line of sight to left rear tire, with the front brake actuating pressure converters and oil reservoirs 40 clustered immediately behind the cab, which is the most protected area. The electric cooling system air intake 42 is provided with sound attenuating lining for noise reduction and located at the center of the deck. The electric control cabinet 44 with forward opening doors is positioned next to the air intake. Just to the right of the control cabinet is the blown retarding grids 46 with center air intake and front and rear heat discharge. Directly behind the cooling system air intake is the ac/dc silicon rectifier package 48 for forced air cooling. The access area of the deck is surrounded by a protective railing 50 and the access area is covered with a skid resistant coating 52.

The remaining operating structures are centrally located for protection by the frame and include the front "HYDAIR II" strut type suspension 54 and high strength suspension retaining link 56 pretensioned with eccentric bushing. A fuel tank 58 is trunnion mounted on the frame. Twin engine exhaust pipes 60 duct rearwardly to the body pivot centerline. The main frame rail 62 extends back to the body pivot 64. A rear frame torque tube 66 is provided together with a ball stud mounted rear suspension 68. A 60" (147 cm) diameter axle center structure 70 provides: great beam strength, ample internal room to house and protect the rear brake pressure converters and oil reservoirs, and the electric power cables to the motorized wheels. Access to the axle structure is provided by a 22" (55 cm) door 72. A cooling air duct 74 from blower to rear axle plenum chamber force ventilates the motorized wheels. A 3- stage body hoist cylinder 76 is provided to lift the dump bed with canopy 30 (FIG. 1). Finally, twin hydraulic steering system accumulators 78 (FIG. 2) are vertically mounted for their hydraulic steering support role.

MAJOR SYSTEM CONTROL COMPONENTS

The diesel electric traction system and control system 12 (FIG. 3) includes a decision making means or control module 90. The control module is a card rack mounted in the main control cabinet 26 (FIG. 1). The card rack contains a bus for interconnection of printed circuit boards. The bus has extra card slots in the card rack to provide expansion and optional equipment. A suitable bus is, for example a standard G-94 bus. The bus uses pin and socket type connectors due to the environmental requirements. A locking means is provided for locking the cards in the slots. The control center uses preferably 16-bit microprocessors to maintain real-time control of the traction drive system. A suitable microprocessor having bit pushing and built-in self test is disclosed in U.S. Pat. No. 4,175,284, issued Nov. 20, 1979, for a "Multimode Process Control Computer With Bit Processing", and U.S. Pat. No. Re. 31,864 issued Apr. 9, 1985, for a "Self Test Feature For Appliance or Electronic Systems Operated by Microprocessor."

Isolation is required between the high power semiconductor circuits and the control system. Thus, an isolation and scaling module 92 (FIG. 3) is mounted in the main control cabinet and is electrically connected to the system control module circuit boards. Isolation is provided, for example, with instrument shunts and isolation amplifiers hereinafter described in the description of the schematics. The isolation and scaling is accomplished using analog signal processing between traction power circuits and the digital processing contained in the system control module.

All truck traction parameters will enter the control system through the isolation and scaling module. The form of communication between the isolation and scaling module and system control may be either analog or digital.

A special detection circuit 94 is used to monitor the motor temperature. The circuit includes a temperature sensor 96 located inside the traction motors and is connected to the system control center for decision and action as described hereinafter.

A low power conditioner 98 is connected to the isolation and scaling module for conditioning a low level leakage current produced by a ground fault detector 100. Ground fault is detected by monitoring leakage current through a resistor 102 connected between the power circuits and the truck frame as ground.

Power is supplied to the system by the alternator 16 which is a tertiary wired alternator driven by the diesel 14 to provide ac current to an armature converter 104. The armature converter is a three-phase full-wave bridge used to rectify the ac output of the main armature winding 106 of the alternator. The armature converter then supplies dc power to the armatures 108 and 110 of two wheel type motors, motor-1 and motor-2.

The armature converter 104 includes, for example six silicon-controlled rectifiers (SCRs) with transient protection circuits, one blocking diode and gate firing circuits described in detail hereinafter. The output of the armature converter is regulated by phase-controlled firing of the SCRs. The gate firing circuitry includes amplification and shaping of timed pulses provided externally by the control system as well as high voltage isolation from the power semiconductors. The gate firing circuitry is mounted in the main control cabinet 26.

A motor field converter 112 is a dual single-phase full-wave bridge used to rectify the AC output of the second tertiary winding 114 of the alternator 16. The motor field converter supplies dc power to the series connected exciting fields (motor exciters 116 and 118). The dual bridge provides polarity reversal of the exciting fields without the use of mechanical reversing contactors.

The motor field converter 112 consists of, for example, eight SCRs with transient protection circuits and gate firing circuits. The output of the motor field converter is regulated by phase-controlled firing of the SCRs. All four SCRs of each bridge are fired simultaneously as only two will be forward biased at any given time. The control system provides protection to insure both bridges are not fired together. The associated gate firing circuitry includes amplification and shaping of timed pulses provided externally by the control system as well as high voltage isolation from the power semiconductors. The gate firing circuitry is in the main control cabinet 26.

Finally, an alternator field converter 124 is connected to the first tertiary winding 126 of the alternator 16 for rectifying ac current into dc for self excitation of the alternator 16. The alternator field converter 124 is a single-phase, full-wave bridge that also includes a battery boost circuit and a crowbar circuit. The battery boost circuit and crowbar circuit will be described hereinafter.

The alternator field converter 124 consists of four SCRs with transient protection circuits, two diodes with transient protection circuits and gate firing circuits. The output of the alternator field converter is regulated by phase-controlled firing of the SCRs. Both SCRs are fired simultaneously as only one will be forward biased at any given time. The associated gate firing circuitry includes amplification and shaping of timed pulses provided externally by the control system as well as high voltage isolation from the power semiconductors. The gate circuitry is in the control cabinet.

For diagnoses and self test purposes, recorder 128 is connected to the system control module 90 to assist in diagnosing faults and tracking vehicle operation to minimize downtime. The recorder is for recording at the sample frequency the last 10 seconds of vehicle operation and every second for the prior 50 seconds variables as follows:

a.* W, engine speed
b.* VM, total motor armature voltage
c.* IM, motor armature current
d.* P, calculated generator input power
e. PAR, propel armature reference
f. RR, retard armature reference
g.* WM1, speed of motor 1
h.* WM2, speed of motor 2
i.* VHM, voltage of the higher voltage motor
j. FR, propel motor field reference
k. RFR, retard motor field reference
l. RC, retard command signal
m.* IF, motor field
n.* IE, alternator field
o. VGR, propel generator voltage reference
p. VGRR, retard generator volts reference
q.* VG, alternator voltage r.* Volts across boost resistor
s. LC, load control
t. VC, voltage control
u.* Motor 1 temperature
v.* Motor 2 temperature
w. IEAC, alternator field AC
x. IFAC, motor field AC The recorder also records: at sample frequency for the last 10 second only the status of all input, logic and output functions hereinafter described in connection with the control system panel and is to stop recording any time one of the latching fault functions hereinafter described occurs: the highest value since the last interrogation of the analog signals (the starred ones of the above list), the count for the digital functions for all warning functions, all fault functions, all input functions, except the blower switch, all logic functions, the throttle solenoid function and the low idle solenoid.

Serial links are provided for interrogation of the recorded data by an off-board device for analysis and permanent recording, and for hand interrogation of the recorded data by an on-board display.

Figure 8:
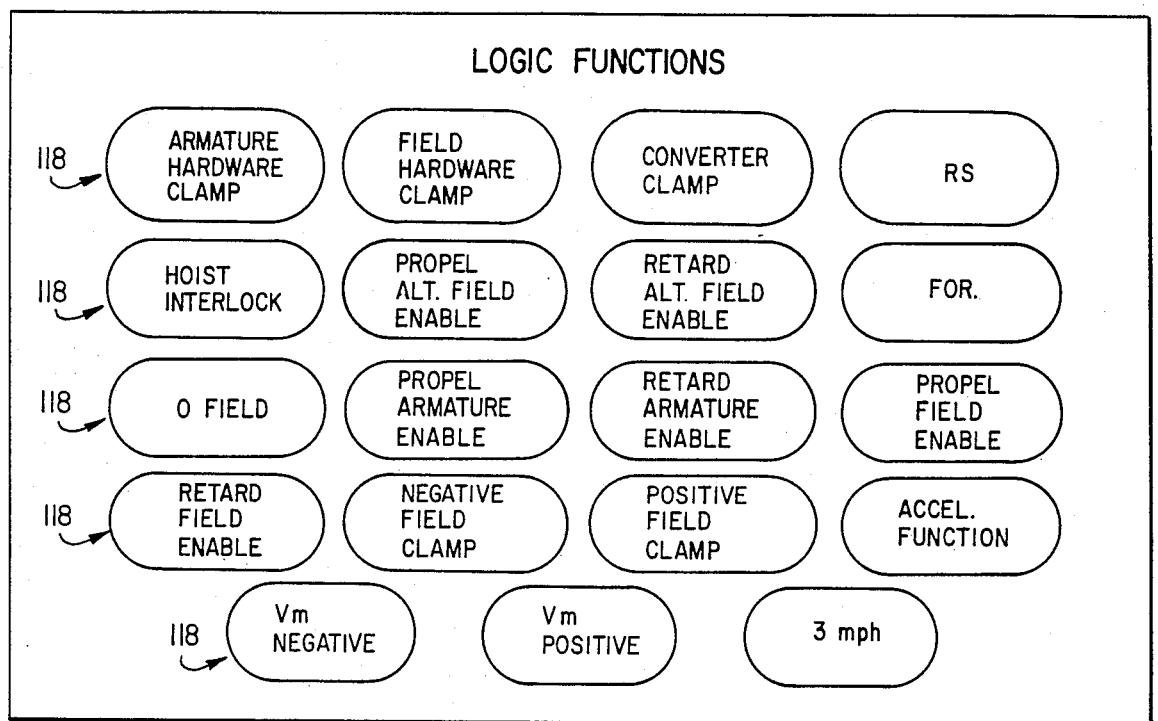
FIGS. 8 and 9 disclose the operator's control and warning light dashboard panels.
Figure 4:
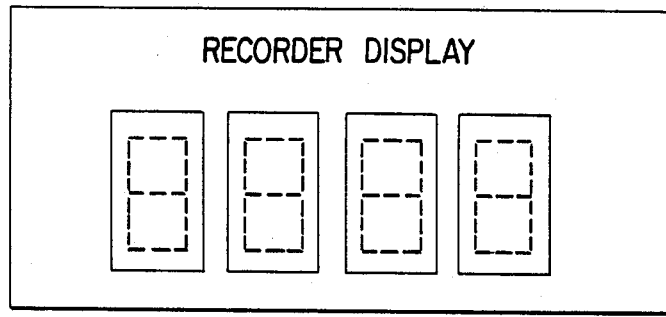
FIGS. 4, 5, 6 and 7 constitute the control centers display panel.
Figure 5:
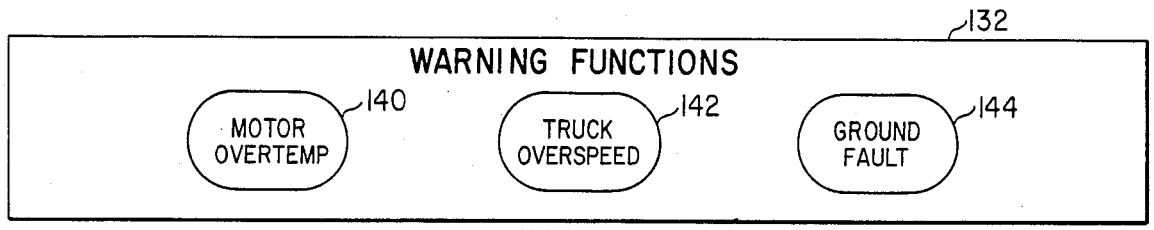
Figure 6:
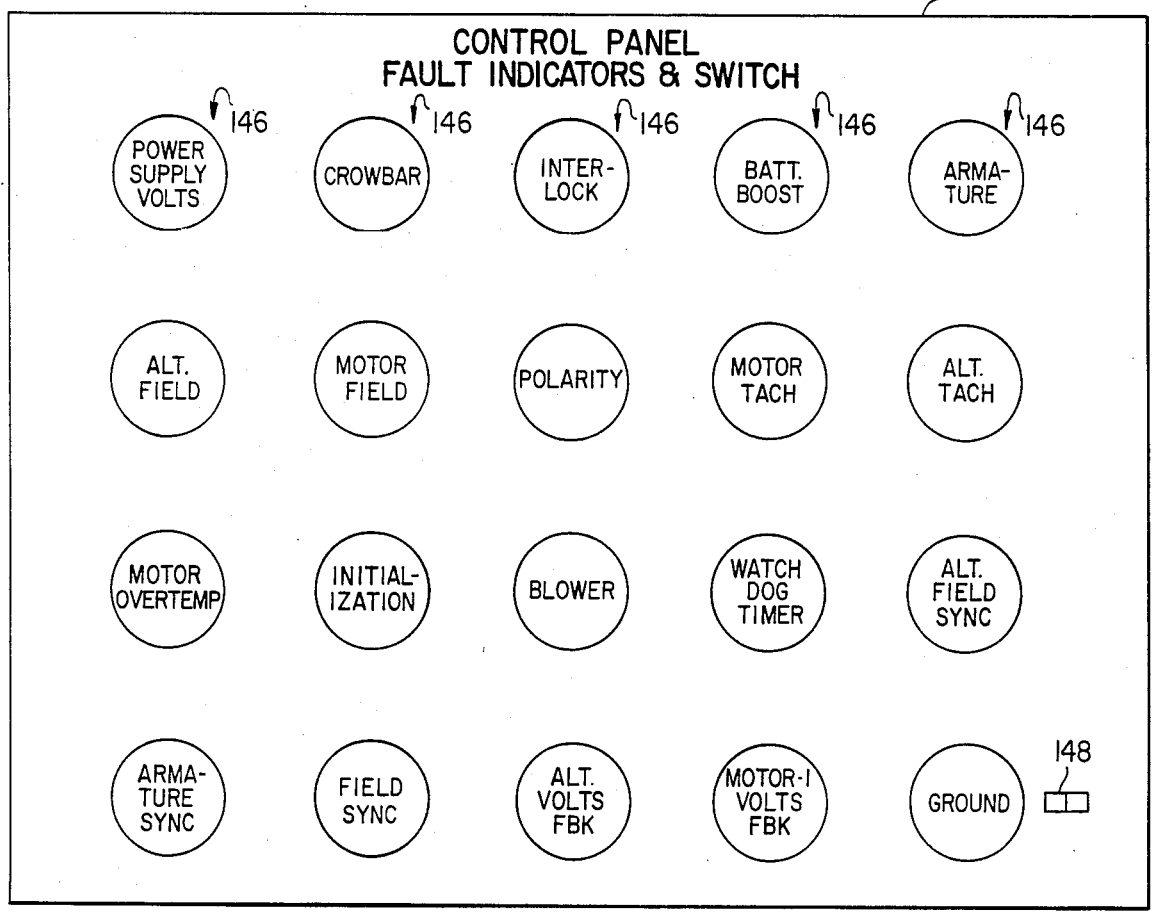
Figure 7:
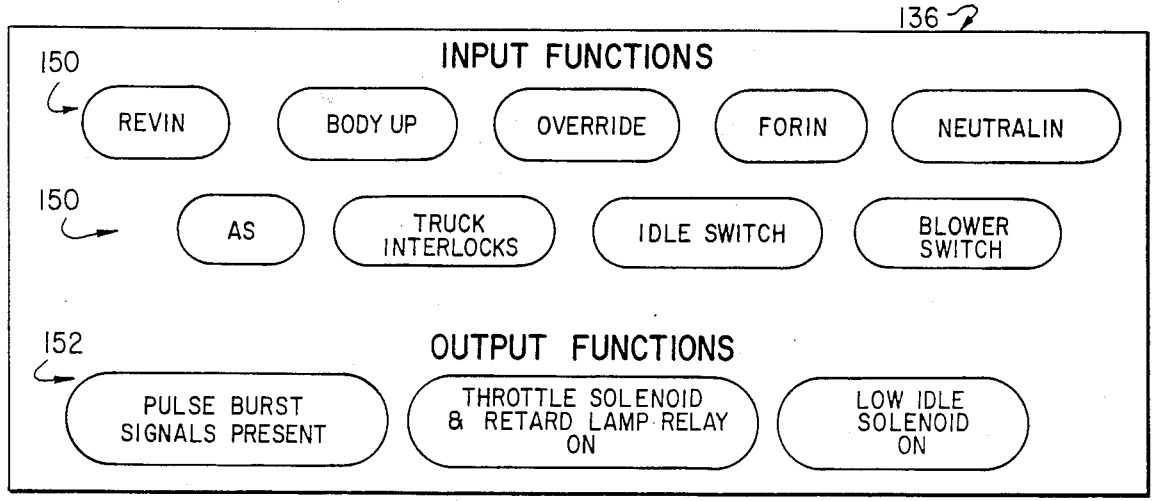

The control system includes an on-board control panel containing the recorder display 130 (FIG. 4), a warning function light panel section 132 (FIG. 5), a control panel fault indicator light and reset switch panel section 134 (FIG. 6), an input and output function indicator light panel section 136 (FIG. 7), and a logic function light indicating section 138 (FIG. 8). The control panel is mounted in the control center cabinet 26 (FIG. 1).

CONTROL CENTER PANEL

The display 130 is a four digit LED display controlled by the control center to continuously display on command any of the above listed variables and the fault codes arising from initialization errors and to permit interrogation of the recorder of all of its contents.

The panel light warning section 132 (FIG. 5) includes, respectively, motor overtemp, truck overspeed and ground fault LED lights 140, 142 and 144.

The control panel fault indicator and reset switch panel 134 (FIG. 6) includes fault indicating lights 146 and a manually operated panel fault reset switch 148. The indicators are used to indicate faults as follows: power supply volts, crowbar, card interlock, battery boost, armature, alternator field, motor field, polarity, motor tachometer, alternator tachometer, motor overtemperature, initialization, blower, watchdog timer, alternator field synchronization, armature synchronization, field synchronization, alternator volts feedback, motor-1 volts feedback, and ground. The reset switch 148 resets all faults and light indicators.

The input and output function light panel section (FIG. 7) includes input function lights 150 to indicate input functions as follows: reverse in, body up, override, forward in, neutral in, alternator switch, truck interlocks, idle switch, and blower switch. While the output function lights 152 indicate output functions as follows: the presence of all pulse burst signals (detected at the printed circuit board which receives the burst from the main control panel), the throttle solenoid and retard lamp relay, and low idle solenoid.

The logic function indicating panel section 138 (FIG. 8) includes lights 154 to indicate logic functions as follows: armature hardware clamp, field hardware clamp, converter clamp, retard switch, hoist interlock, propel alternator field enable, retard alternator field enable, forward, O field, propel armature enable, retard armature enable, propel field enable, retard field enable, negative field clamp, positive field clamp, accelerator function, motor voltage negative, motor voltage positive, and three mile/hour.

CAB DASHBOARD PANEL

Figure 9:
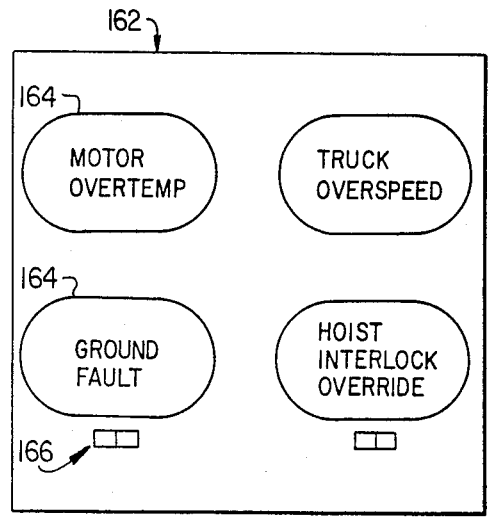

Because of the significance of the following functions to vehicle operation, a special panel 162 (FIG. 9) of lights 164 is provided as follows: motor overtemperature, truck overspeed, ground fault, and hoist interlock override. Manual switches 166 are provided for the ground fault and hoist interlock override.

SYSTEM ELECTRICAL CIRCUITRY

Alternator Field Converter

Figure 10A:
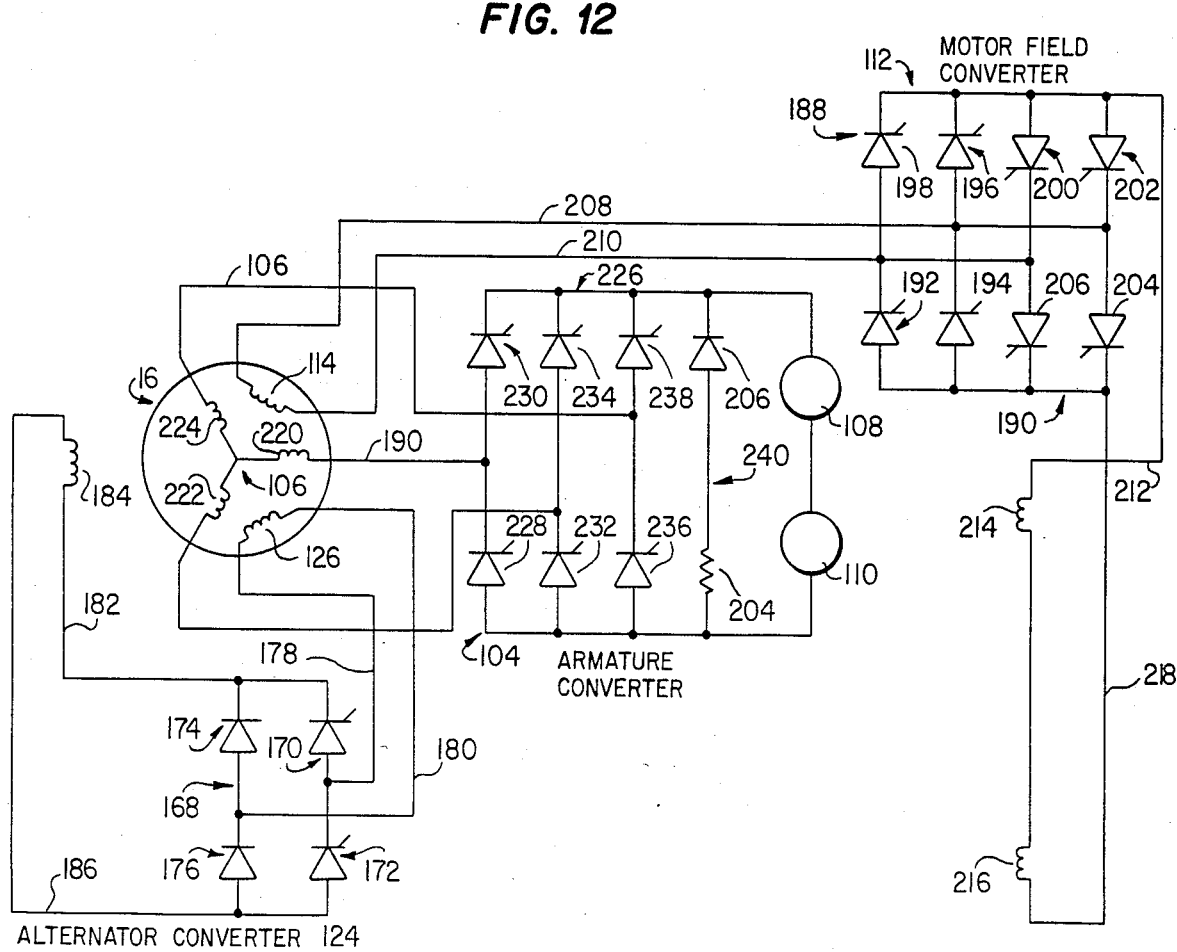

The alternator field converter 124 FIG. 10a) consists of a single phase bridge 168 with two silicon controlled rectifiers (SCRs) 170 and 172 and two diodes 174 and 176. The two terminals of the winding 126 are connected by leads 178 and 180 to the junctions of anodes of SCR 170 and diode 174 and cathodes of SCR 172 and diode 176, respectively. The cathodes of diode 174 and SCR 170 of the bridge are connected by lead 182 to one terminal of exciter coil; the anodes of the SCR 170 and diode 176 are connected by lead 186 to coil 184. The SCRs gates (firing terminals) are connected to logic firing circuits hereinafter defined. Thus, the alternator winding 126 in operation self excites the alternator 16.

Motor Field Converter

The motor field converter 112 consists of two single phase SCR bridges 188 and 190 with eight SCRs 192, 194, 196, 198, 200, 202, 204, and 206. A first terminal of winding 114 is connected by lead 208 to the junction of the cathode of SCR 194 and anode of SCR 196 and to the junction of the cathode of SCR 202 and anode of SCR 204; while the second terminal of winding 126 is connected by lead 210 to the junction of the cathode of SCR 192 and anode of SCR 198 and to the junction of the cathode of SCR 206 and anode of SCR 200. SCRs 192, 194, 196, and 198 form a positive bridge for forward propel or reverse retard. SCRs 200, 202, 204, and 206 form a negative bridge for reverse propel or forward retard. These two bridges are interlocked to prevent short circuit operations which would occur if both conducted simultaneously. The junction of the cathodes of SCRs 198 and 196, and the anodes of SCRs 200 and 202 is connected by lead 212 to the serially connected motor field coils 214 and 216 while the junction of the anodes of SCRs 204 and 206, and the cathodes of SCRs 192 and 194 is connected by return lead 218 to the coils 216 and 214. The SCRs gates are connected to firing logic circuits hereinafter described.

Armature Converter

The armature converter 104 consists of the main three phase alternator 106 windings 220, 222 and 224, full wave SCR bridge 226 consisting of six SCRs 228, 230, 232, 234, 236 and 238. The alternator three phase windings 220, 222 and 224 are connected, respectively, to the junctions of the cathodes and anode of SCRs 228 and 230, cathode and anode of SCRs 232 and 234, and cathode and anode of SCRs 236 and 238. The gates are connected to firing logic circuits hereinafter described.

RETARD BLOCKING

A retard blocking circuit 240 (FIG. 10a) is connected across the junctions of the SCRs and across the serially connected motor 1 and motor 2 armatures 108 and 110.

The blocking circuit includes a resistor 204 and a diode 206 connected across the motor armatures 108 and 110. Thus, in the propel mode, power flows from the ac alternator 16 through the armature field converter to the armatures 108 and 110 of motor-1 and motor-2. In the retard mode, the polarity of motor-1 and motor-2 is reversed so that armature voltage and power reverse. Therefore, in the retard mode, motor-1 and motor-2 act as generators and power flows from them to retarding grids hereinafter described. At mid-range to low speed, power flows from motor-1 and motor-2 through the armature field converter to the alternator. The power absorbed by the alternator 16 motors the engine 14 (FIG. 1) and serves to provide a retarding effort at low speed without contactors.

TRACTION CONTROL SYSTEM

The traction control system is divided into two parts for purposes of description. One part is an alternator control system for forward propel and forward retard and the other a field voltage control system for reverse propel and reverse retard.

Alternator Voltage Control

The alternator voltage is programmed to follow the motor voltage but to be always higher than the motor voltage.

The armature converter 226 motor voltage (VM) (FIG. 10b) is the basis for several functions hereinafter described. Thus, the motor voltage output connections will be first described. The armature converter is connected to the junction of a summer 250, motor armatures 108, and 110, multiplier 252, summer 254, positive and negative motor voltage function generators 256 and 258, and summer 260.

Voltage Error

Figure 10B:
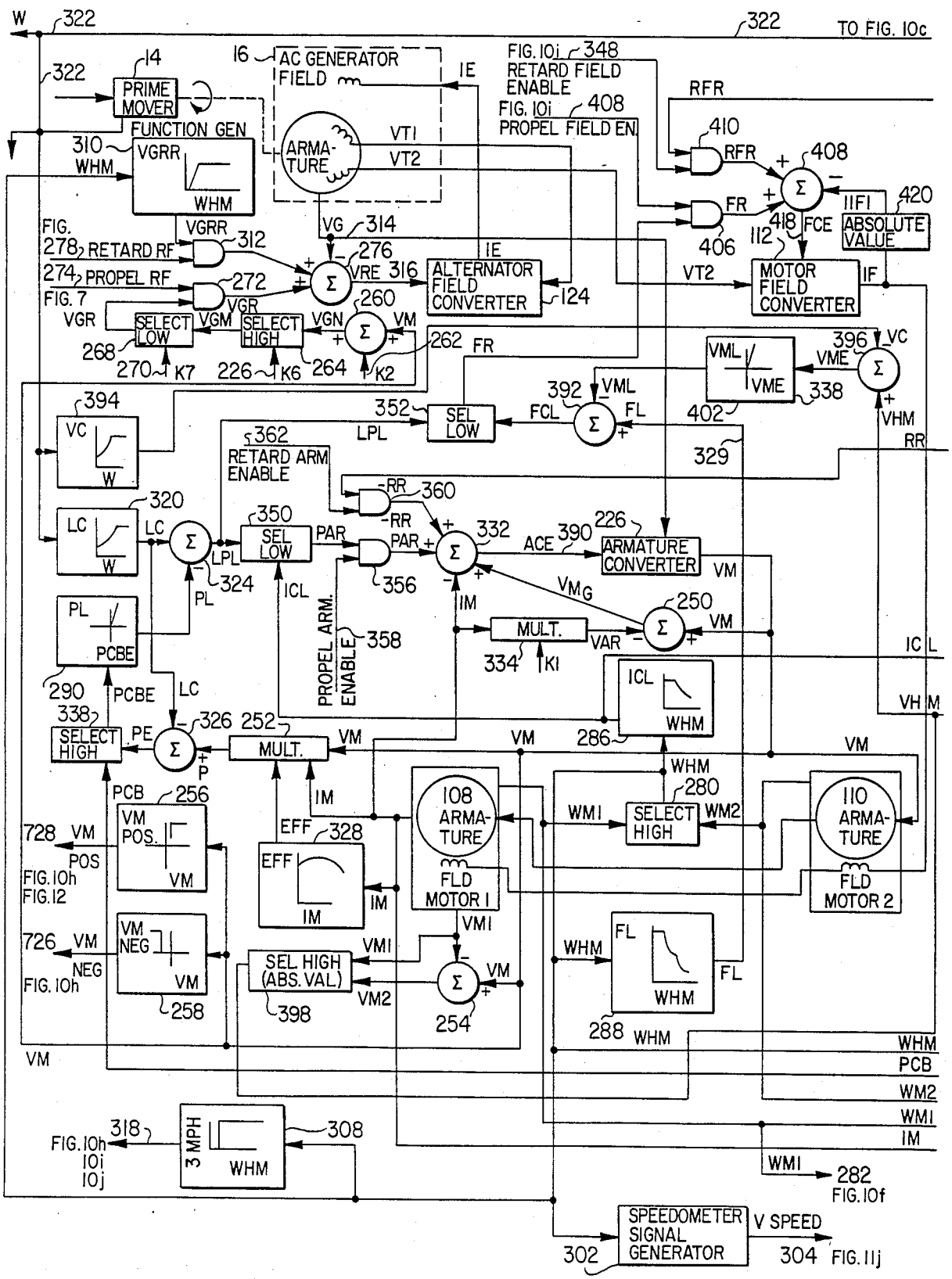

Summer 260 adds the motor voltage feedback to a constant input signal (K2) 262, representing the normal difference between motor voltage and alternator voltage, to produce a normal alternator voltage signal (VGN). A select high comparator 264 is connected to summer 260 and to a constant input signal (K-6) 266, representing a minimum desired alternator voltage, for producing the higher signal for use as a minimum alternator voltage signal (VGM). A select low comparator 268 is connected to the select high comparator 264 and to a constant input signal (K7) 270, representing the maximum allowable alternator voltage in the select low comparator, for producing a propel alternator voltage reference signal (VGR). The constants are derived by trial and error by those persons skilled in the art pertaining to the operating parameters required for the particular vehicle. An AND gate 272 is connected to the select low comparator 268 and to line 274 leading to a propel alternator field enable logic circuit (FIG. 10i). When the alternator field enable signal is high summer 276 has one terminal connected to receive the propel reference signal. The second terminal of summer 276 is connected to receive a retard voltage regulator reference 278 produced by AND gate 312, AND gate 312 receives a retard alternator field enable signal from logic circuit 278 (FIG. 10i) and a higher armature rotational speed signal (WHM) signal input from function generator 310.

Figure 10C:
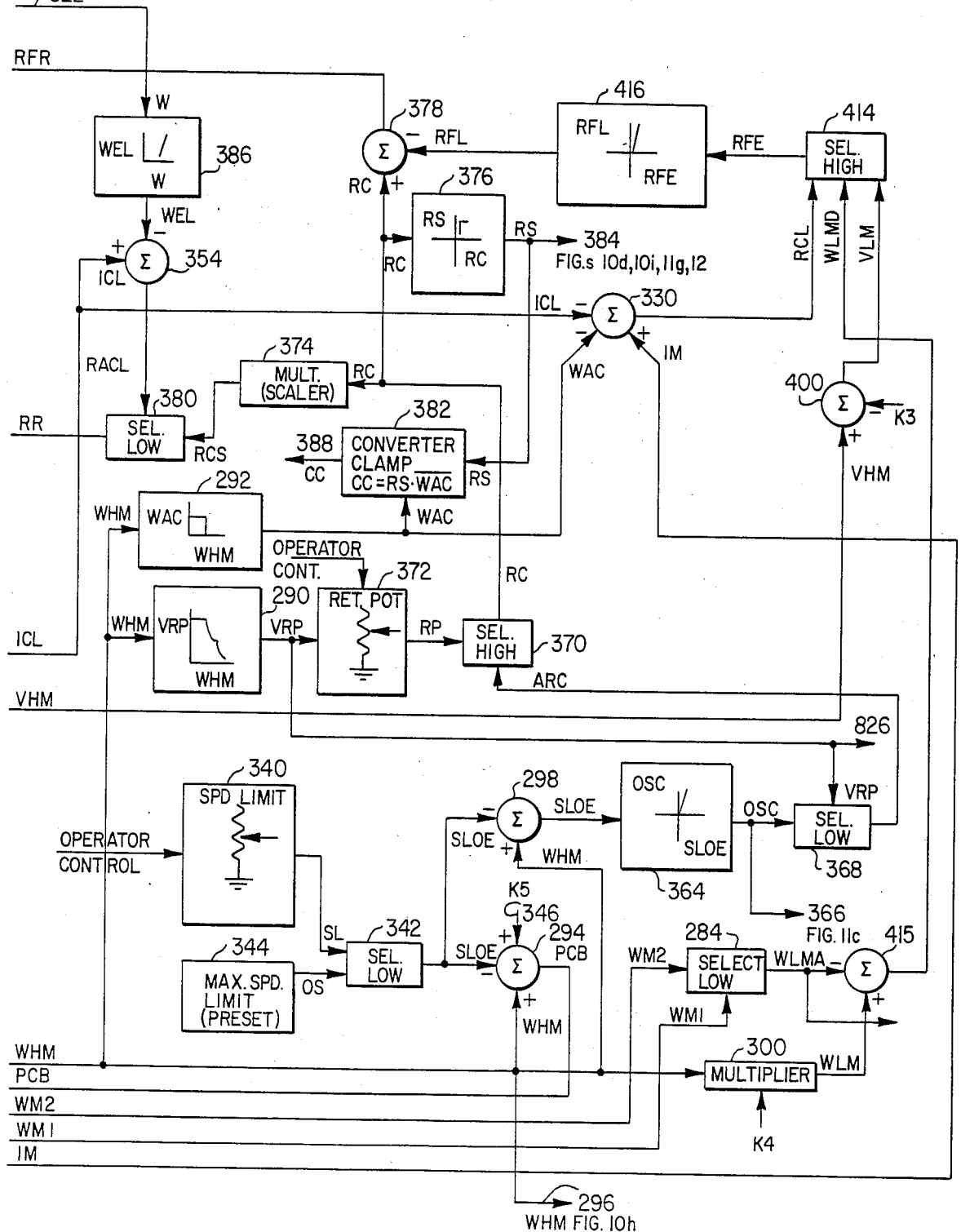

The speed of the higher motor armature is determined by select higher rotational speed (select high) comparator 280 (shown between the motors 108 and 110) having a first input terminal connected to the junction of motor armature 108 (WMI), motor 1 armature speed line 282 and a select low comparator 284 (FIG. 10c). A second input terminal is connected to the junction of motor armature 110 and select low comparator 284 for receiving speed signals from the motor armatures 108 and 110 which is a required input to the retard voltage regulator function generator 310.

The higher motor speed (WHM) output (FIG. 10b) is used for many additional functions as follows; thus, select high 280 is connected to the junction of a commutator current limit (ICL) function generator 286, a field limit (FL) logic function generator 288, a foot pedal modulator (VPR) logic function generator 290 (FIG. 10c), a high speed signal at low motor speeds (WAC) logic function generator 292, operator control summer 294, output lead 296 to a motor tach fail detector (FIG. 10h), summer 298, multiplier 300, speedometer signal generator 302 (FIG. 10b), to output lead 304 to speedometer 306 (FIG. 11j); and 3 mph function generator 308 (FIG. 10b), all in addition to the retard voltage regulator reference logic (VGRR) function generator 310.

Figure 10D:
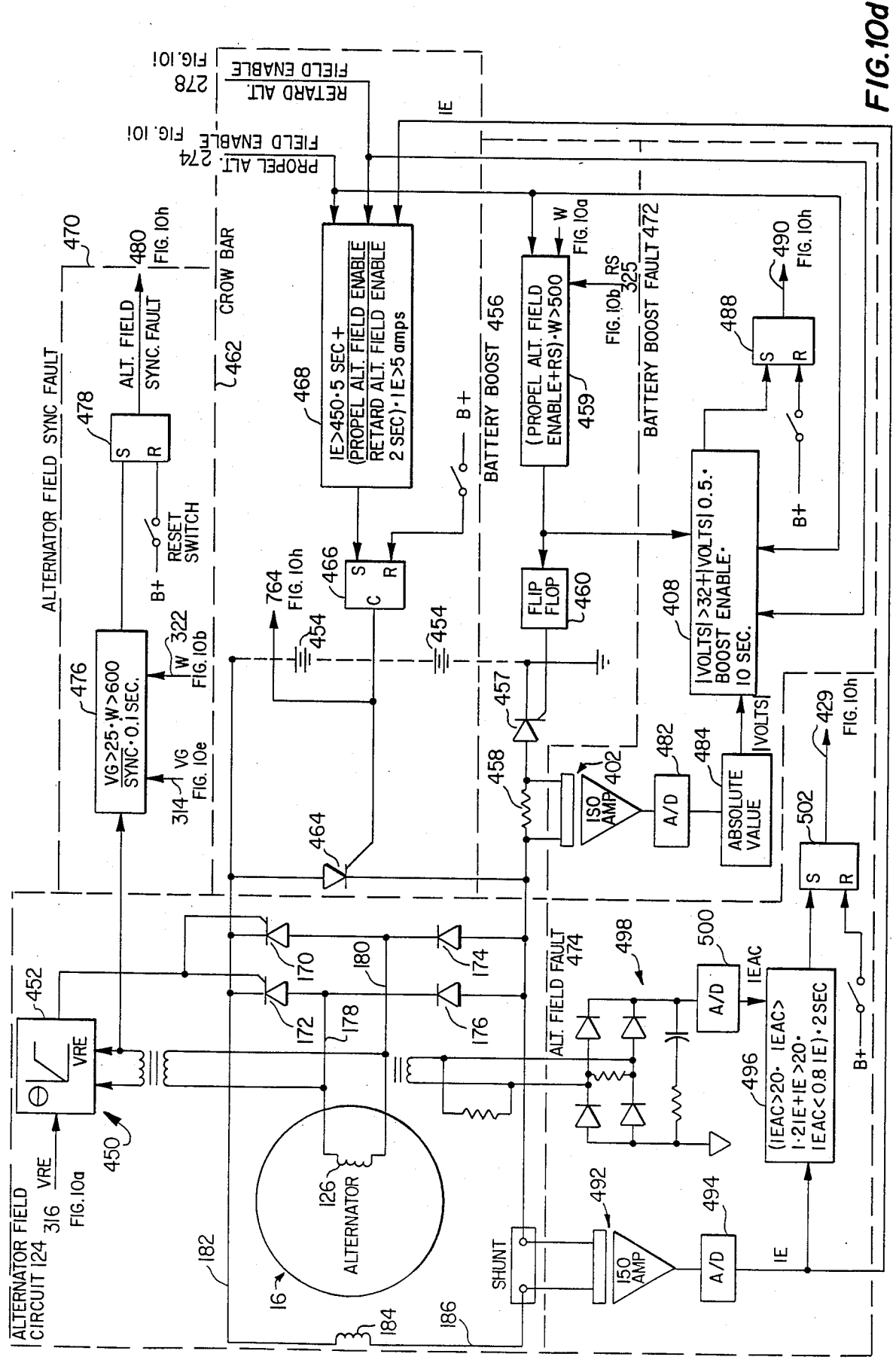
Figure 10E:
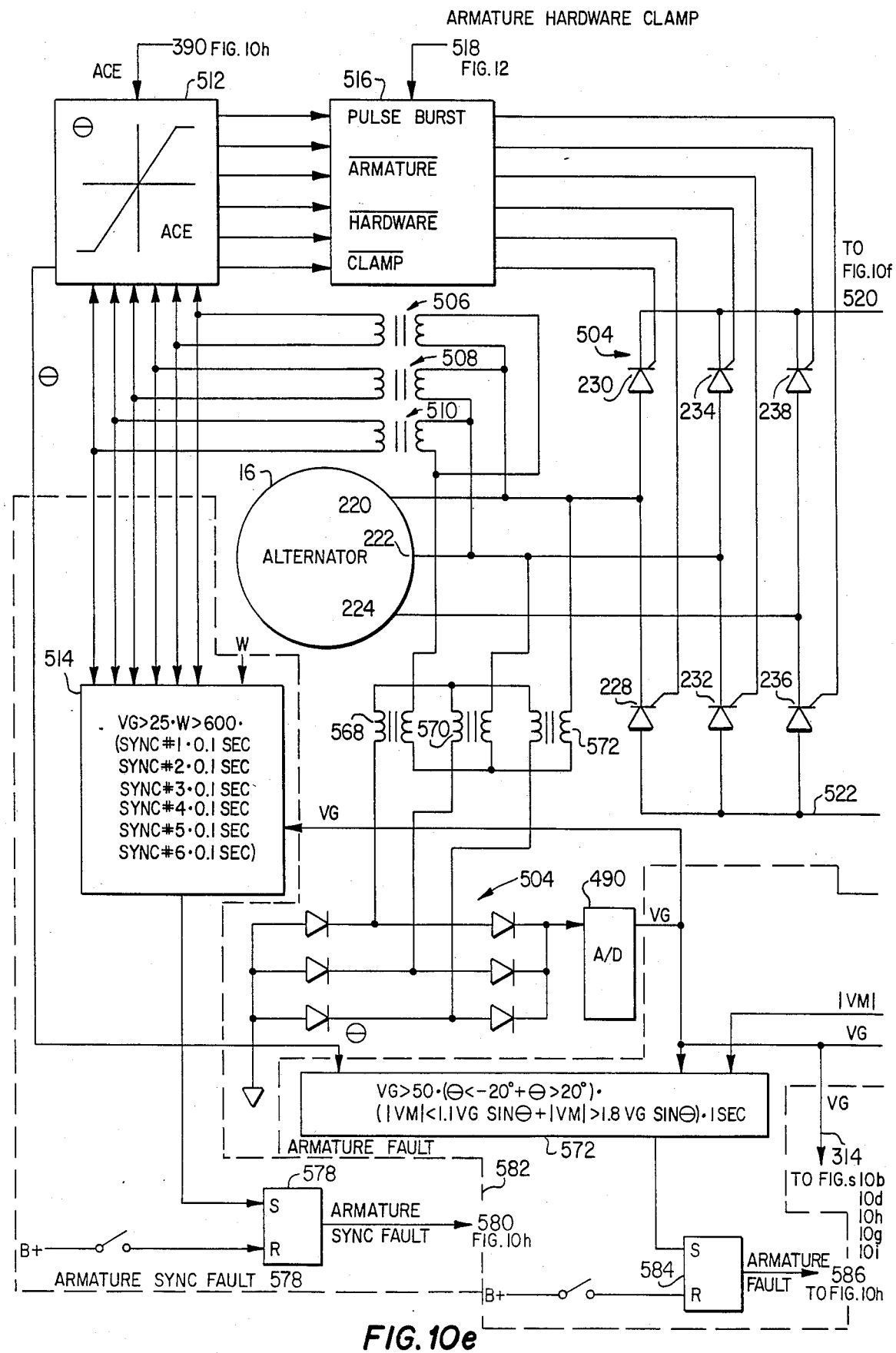
Figure 10F:
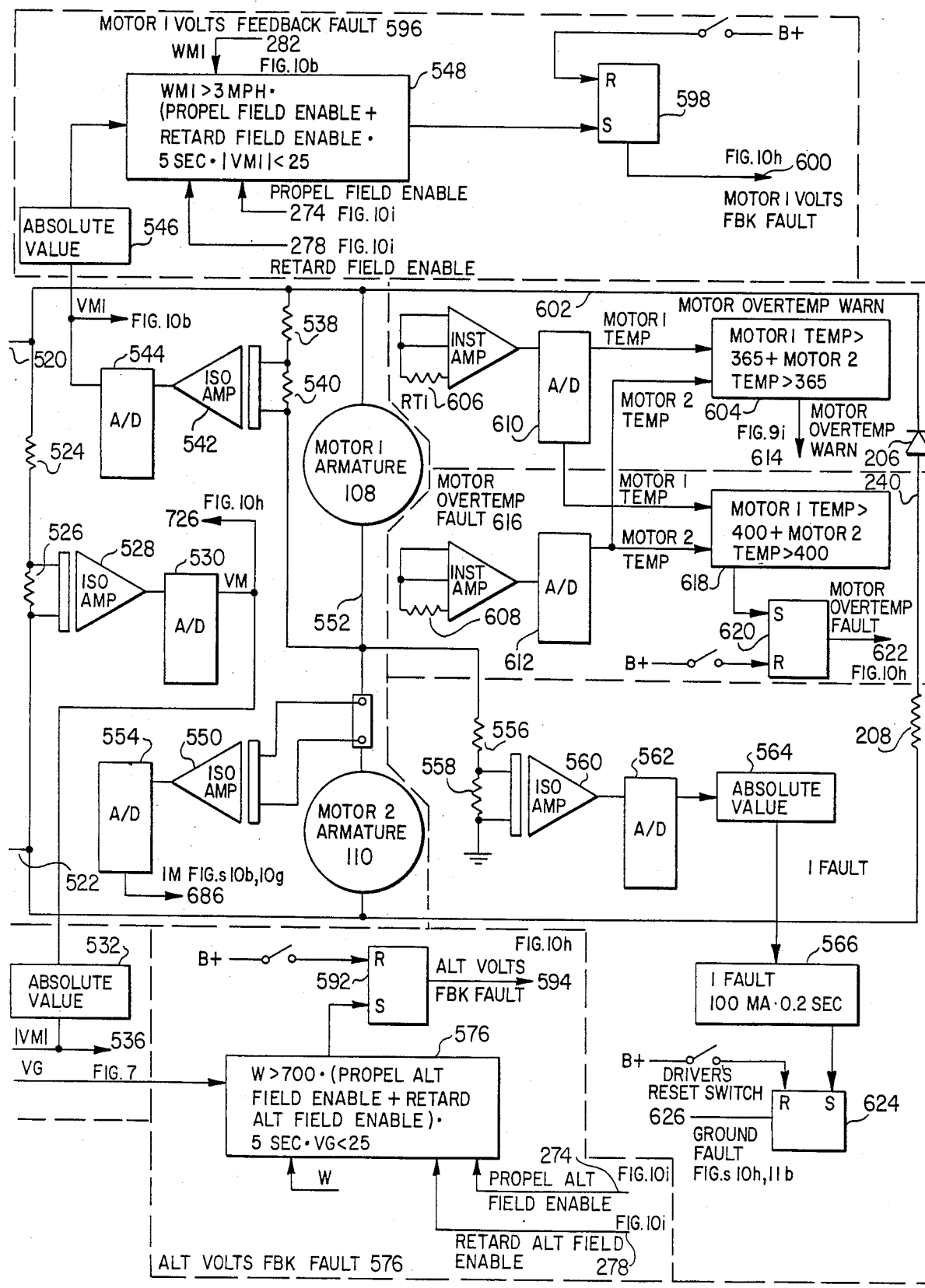

An AND gate 312 is connected to the VGRR function generator 310 to pass the retard voltage regulator (VGRR) reference signal to summer 276 when a retard alternator field logic circuit (FIG. 10i) goes high on line 278. The summer 276 then compares either the voltage regulator reference (VGR) or the retard voltage regulator reference (VGRR) to the alternator's voltage (VG) 314 to develop the voltage regulator error (VRE) signal 316 which is applied to the alternator field converter 124. The VRE signal controls the firing of the SCRs in the alternator field converter (FIG. 10d).

The voltage of tertiary 1 126 (VT1) is connected to the alternator field converter 124 whose output voltage (IE) is supplied to the alternator field for self excitation.

Figure 10H:
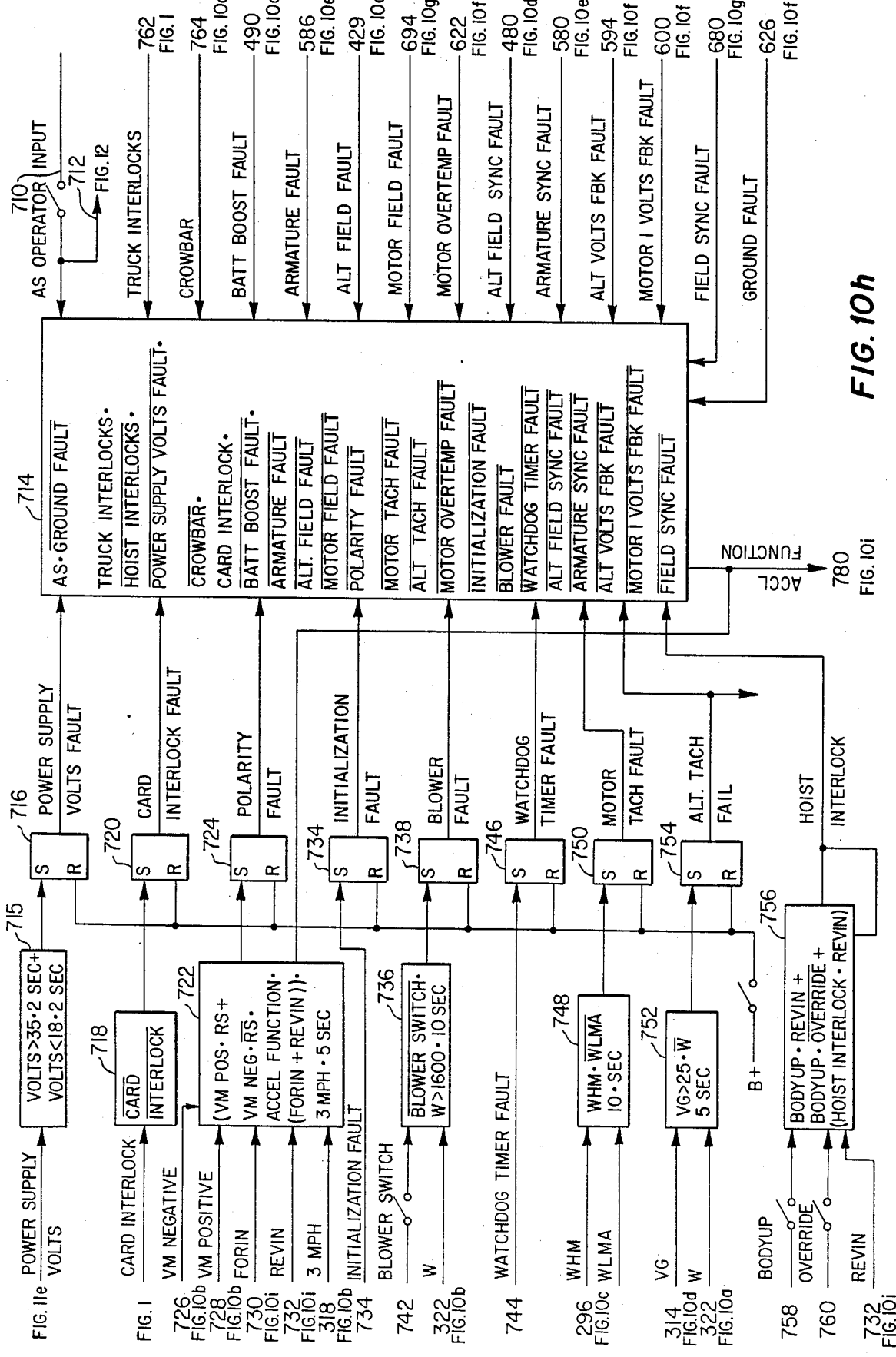
Figure 10I:
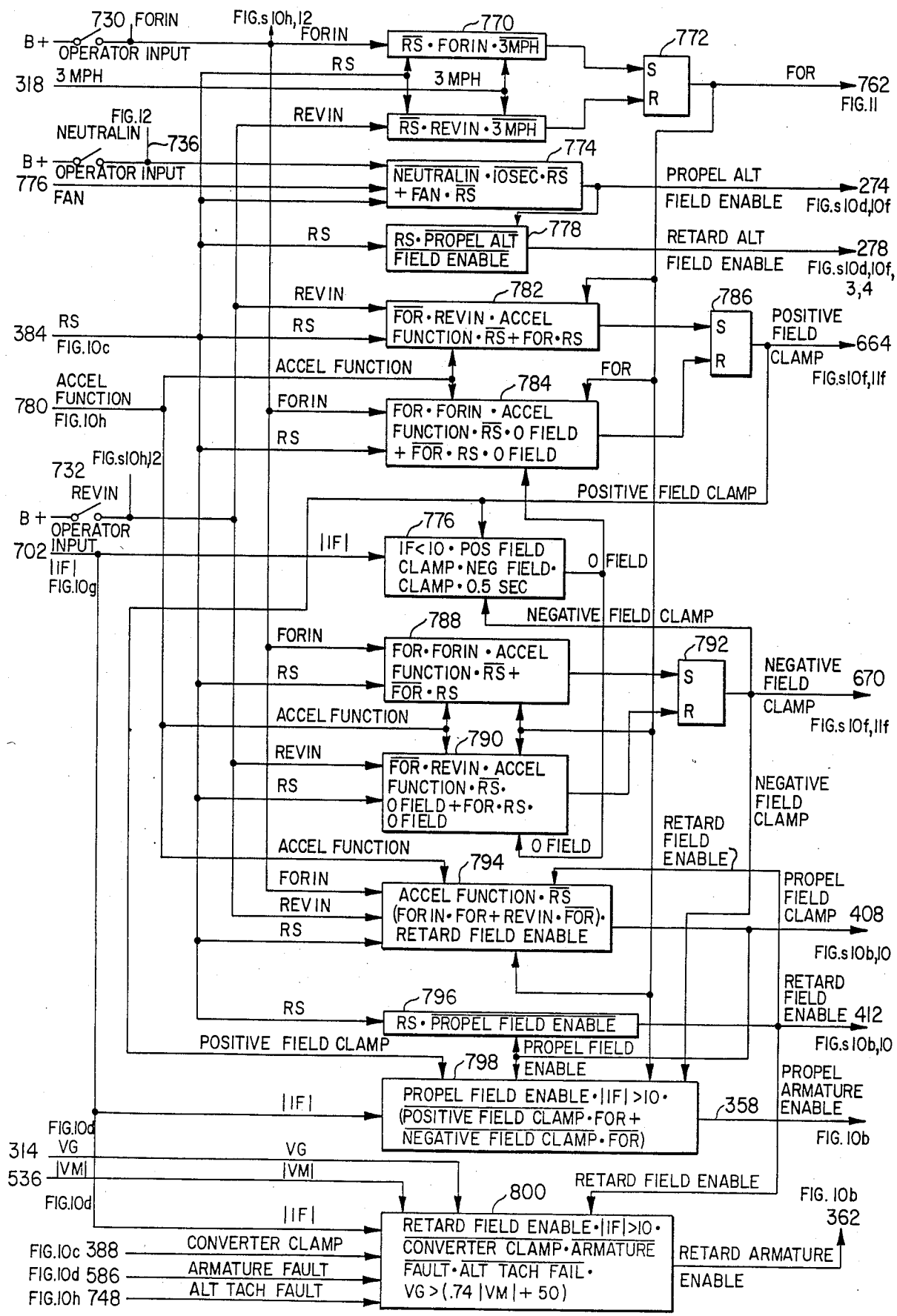

The 3 mph logic function generator puts out a high signal on lead 318 whenever the speed of the faster motor exceeds 3 miles per hour to logic circuits in FIGS. 10h, 10i and 10j.

Propulsion Control

Power in propulsion is controlled in different ways. At low motor speeds when counter emf of the motors is very low, armature current and field current are limited. At mid-range speeds power is calculated by the control center computer means and armature and field current are limited to stay within the capability of the prime mover. At high speeds motor field is weakened so that the traction motors can continue to draw full power from the prime mover. Near the upper speed end of the motors, armature current is limited to stay within the commutation capability of the motors. A power cut back function is used to reduce power demand on the prime mover as a function of motor speed.

A load control (LC) signal is used as the primary armature and field current control during propel operation. Both armature and field currents are controlled by the same signal, thus providing characteristics similar to that of a series motor. To develop the load control (LC) signal, a load control logic function generator 320 is connected to the prime mover 14 for an engine speed (W) signal on lead 322. The load control function generator 320 is connected to the junction of a summer 324 and to a propel error summer 326. Summer 324 is also connected to a power limit (PL) signal developed as now described before proceeding.

Power Limit

A power (P) signal supplied by multiplier 252 is connected to the summer 326. Multiplier 252 multiplies the motor voltage (VM) by the motor armature current (IM) and current efficiency (EFF) to provide the power signal. These signals are developed using motor armature 108. The motor armature 108 is connected to provide motor current to the junction of multiplier 252 and efficiency function generator 328, in addition to a retard control limit summer 330 (FIG. 10c), and armature converter error (ACE) summer 332 (FIG. 10b) and its multiplier 334. The efficiency logic function generator 328 is connected to the multiplier 252 to provide the efficiency factor. Summer 326 subtracts the power output of the multiplier 252 from the load control signal to provide a power error (PE) signal. A select high comparator 338 connected to the summer 326 compares the power error signal with a power cutback (PCB) signal and selects the high one for the power cutback signal.

Power Cutback

The power cutback signal is produced under operator control (FIG. 10c) applied to a speed limit (SL) potentiometer 340, subject to automatic speed limiting. The potentiometer is connected to select low comparator 342. A preset maximum speed limiter 344 is connected to the comparator 342 for comparing the operator control signal to the overspeed (OS) signal for determining the lower of the two signals. The speed limit signal becomes the reference speed signal which is compared to the speed of the faster motor and is used first to cut back propulsion power and them to operate retarding if speed continues to increase. Both propel cutback and retard operations are tapered so that a balanced speed is reached on any grade. The output of the comparator 342 is connected to the junction of a retard command circuit summer 298 and the power cut back summer 250.

Summer 294 adds the higher motor speed (WHM) signal to a constant (K5) 346, which is an increment of motor speed required to reduce propelling to zero before retard, and subtracts the speed limit or overspeed signal to produce the propel cutback speed signal for the select high comparator 338 (FIG. 10b).

The select high comparator 338 selects the higher of the power error or power cutback signal to provide a power cutback error (PCBE) signal. The power limit logic function generator 290 is connected to receive the power cutback error signal and output the power limit signal to the summer 324.

Continuing on with the summer 324, the summer 324 subtracts the power limit signal from the load control signal for producing a level limit (LPL) signal. The power limit signal of summer 324 is connected to the junction of propel armature reference select low comparator 350 for the armature converter and a field reference select low comparator 352 for the motor field converter. Comparator 350 compares power limit signal to a commutation current limit signal (ICL) to produce a propel armature reference (PAR) signal. The commutation current limiter (ICL) logic function generator 286 uses the higher motor armature speed for developing the commutator current limiter signal. The ICL function generator is connected to provide commutator current limit signals to the junction of select low 350 for producing the propel armature reference (PAR) signal for the armature current error summer 332 and to the engine speed limit summer 354 (FIG. 10c) and to the retard current limit summer 330; the latter two for purposes hereinafter described.

To develop the armature current error signal output of summer 332 (FIG. 10b) the remaining inputs to summer 332 will now be developed fully. An AND gate 356 (FIG. 10b) has one terminal connected to receive the propel armature reference (PAR) signal, and a second terminal connected through lead 358 to a propel armature enable logic circuit (FIG. 10i). Upon receipt of a high signal, AND gate 356 passes the propel armature reference signal to one terminal of armature current error (ACE) summer 332.

AND gate 360 has one terminal connected to lead 362 to receive a retard armature enable signal from a retard armature enable logic circuit (FIG. 10i) and its other terminal connected to receive a retard reference signal. AND gate 360 is connected to input a retard reference (RR) signal to summer 332. Before proceeding to the other inputs to summer 332 the retard reference signal is described.

The retard reference (RR) signal stems from the operator control potentiometer 340 (FIG. 10c) connected to the select low or overspeed signal and higher speed generated by low select comparator 342 which as previously described was applied to summer 298. The description proceeds from the summer 298.

An overspeed command logic function generator 364 is connected to the summer 298 and outputs an overspeed command (OSC) to the junction of lead 366 to an overspeed clamp circuit (FIG. 11c) and to select low comparator 368 (FIG. 10c) for comparison with a retard potentiometer voltage (VRP) signal produced by function generator 290. The select low comparator 368 is connected to output an automatic retard command (ARC) signal to a select high comparator 370. The select high comparator 370 receives a retard potentiometer (RP) signal from a retarding potentiometer 372 under operator foot pedal control (to the extent the operator does not exceed the maximum voltage retard potentiometer (VAP) voltage output of the logic function generator 290). Optimum foot pedal modulation is created by the logic function generator which generates retard voltage as a function of the speed of the faster motor. This permits the pedal to modulate full travel from zero to 100% no matter what the speed of the motors.

The select comparator 370 connects the retard command (RC) to the junction of a multiplier (scaler) 374, retard switch (RS) function generator 376 and summer 378. The later two for purposes hereinafter described. The scaler 374 is connected to provide a scaled retard command (RCS) signal to a select low comparator 380 for comparison to a retard armature current limit clamp signal (RACL).

The retard switch function and the (RACL) signal required by select low comparator 380 are developed as follows. The retard switch (RS) logic function generator 376 (FIG. 10c) outputs a signal in response to even a slightly positive retard command. The retard switch function always overrides the acceleration switch function not shown. The retard switch signals are connected to a converter clamp 382 and by lead 384 to logic circuitry (FIG. 10i). The above mentioned retard armature current limit clamp (RACL) signal is produced from an engine speed limit logic function generator 386 connected to the prime mover 14 for receiving engine speed (W) and producing prime mover speed limit signals (WEL). The function generator 386 is connected to provide engine speed limit signals to the summer 354 for subtraction of the commutator current limit signal and the difference is the retard armature current limit signal. The RACL signal serves two functions, first it is compared in select low comparator to scaled retard command to provide the operator control over the retarding effect of the regenerative component, and secondly to prevent overspeeding of the engine.

The retard logic (RS) function generator 376 produces a high signal at low motor speeds which is connected to and operated on by a logic converter clamp 382 to produce pursuant to a low a converter clamp signal on line 388 (FIG. 10i). The retard switching function is high logic circuitry operative to shut off firing of the armature converter at high vehicle speeds when in the retard mode and to control the state of retard armature enable received on line 362 (FIG. 10b).

The select low comparator 380 (FIG. 10c) after comparing the RCS signal and RACL signal outputs the retard reference signal (RR). The select low comparator's retard reference (RR) signal is connected to AND gate 360 (FIG. 10b). The output of the AND gate 302 is to the summer 332.

To complete the inputs to the armature control error summer 332 (FIG. 10b), a signal equal to the counter emf of the motors (VMG) is required; this signal creates a firing angle just great enough to sustain the counter emf of the motors so that propel armature reference causes an additional firing angle which can be compared directly to motor current. The emf signal is produced by the multiplier 334 which multiplies the motor current by a constant (K1) representing armature resistance to produce a signal representing voltage drop caused by armature resistance. Summer 250 subtracts the voltage drop signal from the motor voltage to produce the counter emf signal for summer 332.

Summer 332 is now ready to combine the propel armature reference (PAR) signal to the retard reference (RR) signal and the signal equal to the counter emf of the motors (VMG), and compare the total to the motor current (IM) for producing an armature converter error (ACE) signal 390 for controlling the firing angle of the armature converter 124 (FIG. 10e).

Motor Field Converter

Returning now to the summer 324 (FIG. 10b) which as previously stated produced the low power limit signals as one input to the select low comparator 352. The other input to the comparator 352 is a field limit control (FCL) signal produced at the output of summer 392. The inputs to summer 392 are a motor high speed voltage limit (VML) signal and a field limit (FL) signal. The development of these signals will now be described from their origin.

As to the motor voltage limit (VML) signal, a voltage control logic function generator 394 (FIG. 10b) receives a prime mover speed (W) signal and connects a voltage control (VC) signal to a summer 396 input terminal. For the second terminal, the higher motor voltage (VHM) signal is required and produced from motor 1. The motor 1 has its voltage connected to the junction of the summer 254 and a select high comparator 398. Summer 254 subtracts the motor voltage 1 from the total motor voltage to obtain the voltage of motor 2, for the select high comparator 398. The select high comparator determines the high motor voltage which is connected to the junction of a voltage limit signal summer 400 (FIG. 10c) for a function hereinafter described and to the summer 396 (FIG. 10b). Summer 396 subtracts the voltage control signal from the high motor voltage and produces a motor voltage error (VME) signal connected to a first terminal of a motor voltage limit (VML) function generator 402. The motor voltage limit function generator 402 provides the motor voltage limit (VML) signal as one input to the summer 392.

As to the field limit signal (second input) for the summer 392, the field limit logic function generator 288 is connected to the summer 392 by lead 329 to provide the field limit signal. The field limit signal establishes a level which is just a little higher than required, and the motor limit signal adds the required precision without the high gains which cause instability. The summer 392 subtracts the voltage motor limit from the field limit to provide the field limit control (FCL) signal to the select low comparator 352.

The select low comparator 352 is now ready to accept either the low power limit (LPL) signal or the field limit control (FCL) signal whichever is lower as the field reference (FR) signal. An AND gate 406 has one terminal connected to receive the field reference (FR) signal and a second terminal connected to receive the propel field enable signal on lead 408 connected to propel field enable signal logic circuit (FIG. 10i). A summer 408 (FIG. 10b) is connected to the AND gate to receive at one input terminal the field reference signal. A second AND gate 410 has one terminal connected to lead 412 to retard field enable logic circuit (FIG. 10i), and a second terminal connected to a retard field reference (RFR) signal (FIG. 10b). The retard field reference signal is developed from three signals forming the inputs to a select high comparator 414 (FIG. 10c).

The first signal is the motor voltage limit (VLM) signal produced from the summer 400. Summer 400 compares high motor voltage (VHM) to a constant (K3) which represents the maximum permissible motor producing voltage limit signal. The motor voltages are monitored and motor field current reduced at midrange speeds to limit motor voltages.

The second signal is the motor differential limit (WLMD) signal produced from the multiplier 300 which multiplies the speed of the faster motor by a constant (K4) which is the ratio of the speed of the slow motor divided by the speed of the fast motor in a minimum turning radius for the vehicle with no wheel slippage. A summer 415 is connected to the multiplier to receive the low motor speed signal. Summer 415 is also connected to the select low comparator 284 for receiving the actual low motor speed signal (WLMA) for subtraction from the maximum normal low motor speed to create the motor differential limit (WLMD) signal.

The third signal is the current limit signal produced by summer 330. Summer 330 compares actual motor current (IM) to the motor commutation current limit (ICL) and the converter clamp motor speed (WAC) which is high at low speeds to create the retard current limit (RCL) signal. The converter clamp motor speed signal (WAC) prevents the circuit from reducing motor field at low motor speeds.

The select high comparator 414 outputs the largest of the three signals as the retard field error (RFE). A retard field error logic function generator 416 is connected to the high selector comparator and generates a retard field limit (RFL) signal for the summer 378. Summer 378 subtracts the retard command (RC) from the retard field limit (RFL) to produce the retard field reference signal for the AND gate 410 (FIG. 10b).

The summer 408 combines the outputs of the AND gates 406 and 410 and subtracts an absolute current IF signal to produce the field converter error (FCE) signal on 418 for the motor field converter 112. The absolute field current signal is produced from the field current produced by the motors 1 and 2 fields connected in series to the junction of the absolute value circuit and to the motor field converter 112.

Alternator Field Circuit

The alternator circuitry (FIG. 10d) includes a field circuit 124 which includes the alternator's self exciting winding 126 (FIGS. 10a and 10d) connected by leads 178 and 180 to a single phase bridge with two SCRs 170 and 172 and two diodes 174 and 176. The circuit configuration permits both SCRs to be fired simultaneously as only one will be forward biased at any given time, but both positive and negative zero crossing timing marks are required. The conduction angle theta is defined as 180 degrees minus the firing angle with the firing angle being defined as the number of degrees after the zero crossing mark that the SCR is fired. The increasing voltage regulator error (VRE) of summer 316 (FIG. 10b) increases the output of the converter. The tertiary winding 126 is magnetically coupled with the main armature winding because it lies directly on top of it and produces voltages which are induced by armature current as well as voltages which are produced by air gap flux. The SCRs are high power devices capable of switching these voltages.

The SCR firing circuitry includes a zero crossing circuit including a isolation transformer 450 having its primary winding connected to the leads 178 and 180 and its secondary winding connected to the conduction angle logic function generator 452. The function generator also receives the voltage regulator error (VRE). The logic output is connected to the gate terminals of the SCRs for controlling their firing.

Battery Boost Circuit

A battery boost circuit 456 includes the car battery 454 (two 12 v batteries connected in series). An SCR 457 having its cathode connected to the negative terminal of the battery and its anode connected through a shunted resistor 458 to the alternator field.

The gate of the SCR is connected to the logic circuitry 459 which controls the battery boost circuit. The inputs to the logic circuits are the engine speed W 322 (FIG. 10b), retard switch function on line 384 and propel alternator field enable on line 274 (FIG. 10i). The logic equation is set forth in the block 459.

The battery boost circuit applies the vehicle battery power (24 Volts) through resistor 458 to the alternator field to get an initial build-up of magnetic flux until the alternator is capable of exciting itself through the tertiary winding. The SCR 456 is triggered only when engine rpm is high enough to sustain self-excitation and only when the control circuit actually calls for alternator excitation. A flip-flop (one shot) 460 connected to the logic circuit output produces a square output pulse of several seconds duration to insure firing of the SCR and should not produce another pulse until the logic signal driving it has transferred low and back high again. The SCR is cut off by the rising voltage in the winding.

Crowbar Circuit

A crowbar circuit 462 is provided to shut down the output of the alternator under certain conditions. The circuit consists of an SCR 464 connected across the exciter circuit with its anode connected to the positive side of the car battery and its cathode connected to the negative side of the battery 454. The gate of the SCR is connected to the output of a flip-flop 466. Logic circuit 468 is connected to the set terminal of the flip-flop to operate the crowbar SCR is excitation current IE exceeds a maximum permissable value for 5 seconds, or if the control does not call for alternator field for a period of 2 seconds and the field fails to decay to a 5 ampere level during those 2 seconds. Thus, the inputs to the logic circuitry are the exciter current IE, retard alternator field enable 274 pulse, and the propel alternator field enable 278 pulse. The logic equation is set forth in the block 468.

PROTECTIVE CIRCUITS

In support of the diagnostic and monitoring computer controlled circuits, protective circuits are added to the alternator field circuit. These circuits include detectors for an alternator field synchronization fault 470, a battery boost fault detector 472 and an alternator field fault 474.

PROTECTIVE CIRCUITS

Alternator Field Sync Fault

The alternator field synchronization fault detector 470 includes a logic circuit 476 having as inputs the output of the alternator's armature winding 126 used as the synchronization pulse, the engine speed (W) 322 (FIG. 10b) and the alternator voltage (VG) 314 (FIG. 10e). The alternator field synchronization fault detector operates only when engine speed W exceeds 600 rpm and alternator voltage VG is 25 or more to detect the lack of a synchronization pulse for more than 100 milliseconds. When a fault is detected a flip-flop 478 is set and can only be reset with a manual switch on the control panel. The output is on line 480 to FIG. 10h. The logic equation is set forth in the block diagram 476.

Battery Boost Fault

The battery boost fault 472 detects a reverse shorted battery boost SCR by sensing excesive voltage (greater than 32 volts) across the resistor 458 and a forward shorted SCR (0.5 volts) is detected by sensing voltage across the resistor 458 for an excessive time (10 seconds) after the boost trigger enable circuit has called for boost current. The resistor 458 is sensed by an isolation amplifier 402, which has no effect on the exciter circuit. An analog to digital converter 482 digitizes the amplifiers output for an absolute value determining circuit 484. A logic circuit 408 is connected to receive inputs from the battery boost logic block 458, battery boost resistor volts (VOLTS) 484, and propel and retard alternator field enable pulses 274–278. If a fault is detected a set pulse is sent to flip-flop 488 which can only be reset by a manual switch of the control panel. The flip-flop output is on line 490 to FIG. 10h.

Alternator Field Fault

The alternator field fault 474 detects shorted SCRs by monitoring alternating current input to the bridge and comparing it to direct current output. If alternating current exceeds direct current a shorted cell or open direct current feedback loop is indicated. The circuit includes an isolation amplifier 492 inductively coupled to the ac exciter line 186 between the SCR bridge and converter coil 184 to provide ac to analog to digital converter 494. The analog to digital converter converts the ac to digital signals for input to logic circuit 496. An ac rectifying bridge and dc circuit 498 is inductively coupled to the ac output of the winding 126 on lines 178 and 180. An analog to digital converter 500 digitizes the dc and inputs it into the logic circuit. The logic circuit compares the dc and ac and if the alternating current exceeds dc a shorted cell or open direct current feedback loop is indicated. The comparison is made only if the exciter current is above 20 amperes so that offset in the measurement will not cause false indications. If the ac is less than the direct current, an opening alternating current feedback loop is indicated. The logic equation is in the logic block 496. A fault indication sets a flip-flop 502 which can only be reset with a manual switch on the control panel. The flip-flop output is on line 429 to FIG. 10h.

Armature Converter

The armature converter 104 (FIG. 10e) is a three phase bridge 504 with six SCRs 228, 230, 232, 234, 236 and 238. Its purpose is to rectify and regulate the voltage from the armature of the alternator to the armatures of the motors 1 and 2 and provide reverse power flow and regulation of power flow from the motors to the alternator in retarding. The six SCRs require six synchronizing signals and six firing signals; each of the SCRs are triggered at different times. Increasing positive armature converter error (ACE) thus causes increasing output of the converter in propel. Increasing negative armature converter error will cause increasing power flow from the motors to the alternator in retarding when motor voltage is reversed.

The alternator's phase winding ac output leads 220, 222 and 224 are tapped by transformers 506, 508 and 510 and the ac outputs connected to the junctions of a propel/retard logic function generator 512 and an armature synchronization fault detector logic block 514.

The propel/retard logic function generator 512 receives as an input the armature converter error (ACE) and from the zero crossing information derived from the ac determines the conduction angles for the six SCRs. The conduction angles are connected to a pulse burst control circuit 516 and to the armature synchronization fault logic circuit 514.

Figure 12:
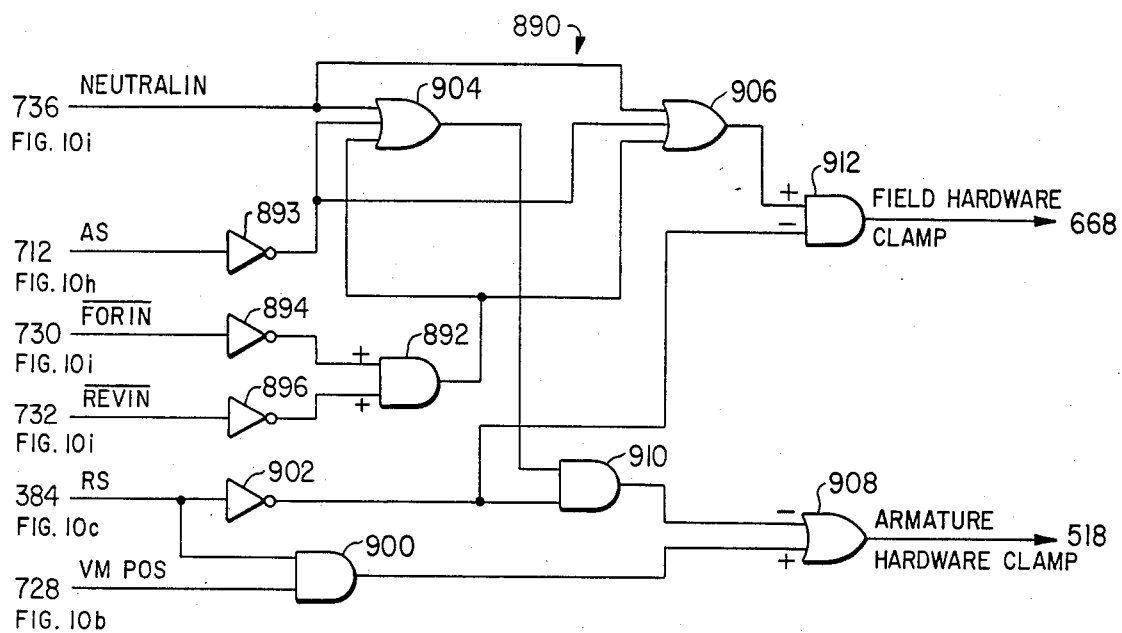
FIG. 12 is a circuit diagram of the field and armature hardware clamps.

The pulse burst control circuit 514 applies pulse bursts in sequence to the six SCRs when the system has not been shut down by the armature hardware clamp output 518 (FIG. 12). The firing of the SCRs controls the ac current flowing to the motor armatures 108 and 110 on leads 520 and 522.

A large blocking diode 206 (FIG. 10f) and retard grid (resistor) 208 are connected in series across the motors. During retard operation when the motors operate as generators to slow the vehicles, motor field polarity is reversed so that motor voltge polarity is reversed. The result is that motor armature current flows through the retard resistor and blocking diode. The motor polarity reversal is also required to permit power flow to the alternator at low speeds in retarding.

Shunt resistors 524 and 526 are connected in series across leads 520 and 522 and an isolated amplifier 528 is connected to shunt the resistor 526 to determine the total motor dc voltage. An analog to digital converter 530 digitizes the motor voltage (FIG. 10b). An absolute value determining circuit 532 is connected to the A/D converter for providing an absolute total motor voltage signal to the armature fault logic circuit 572 (FIG. 10e) and on lead 536 to the retard armature enable logic circuit (FIG. 10i).

The motor 1 voltage (VM1) (FIG. 10f) is determined by connecting resistors 538 and 540 in series across lead 520 and the motor 1 armature 108 and shunting the resistor 540 with isolation amplifier 542. A/D converter 544 is connected to amplifier 542 for digitizing its dc output. The digitized voltage (FIG. 10b) is connected to an absolute value circuit 546 (FIG. 10f) and the absolute value is connected to the motor 1 volts feedback fault detector logic 548 hereinafter described.

The motor current (IM) is determined by isolation amplifier 550 connected to the motor 1 and motor 2 interconnecting lead 552. The amplifier is connected to an A/D converter 554 for digitizing for use as shown and described in FIG. 10b.

The presence of ground fault current (FIG. 10f) is determined by resistors 556 and 558 connected in series between the motor armatures 108 and 110 and to ground. An isolation amplifier 560 is connected to shunt resistor 558 and its output is connected to A/D converter 562 for digitization. The digitized signal is connected to an absolute value circuit 564 and connected as an input to current fault logic circuit 566 hereinafter described. The alternator's ac voltage provided the armature converter is measured by isolation transformers 568, 570 and 572 (FIG. 10e) interconnecting the ac power lines 220, 222 and 226 and the diode bridge 504. The alternator's voltage bridge output is digitized in A/D converter 490 and connected to the junction of lead 314 going to FIGS. 10b, 10d, 10g, 10h and 10i, the armature synchronization fault logic circuit 514, armature fault logic circuit 572 and to the alternator volts feedback fault circuit 576 hereinafter described.

ARMATURE SYNCHRONIZATION FAULT

Armature synchronization fault 578 (FIG. 10e) is determined from the armature voltage (VG), engine speed (W) and all six synchronizing signals inputs to the logic circuit 514.

The armature synchronization fault detects lack of a synchronization pulse for more than 100 milliseconds. It operates only when engine speed (W) is above 600 rmp and alternator voltage (VG) is above 25 volts. The logic equation is shown in block 514. A flip-flop 578 is connected to the logic circuit 514 output and when a fault is detected outputs a signal on lead 580 which can only be reset by a manual switch on the control panel.

Armature Fault

The armature fault 582 is determined by the logic circuit 572 which receives alternator voltage (VG), conduction angle theta, and motor voltage alternator field enable as input signals.

Armature output voltage (motor voltage) is related to armature input voltage (alternator voltage) by the sine of the conduction angle theta. SCRs shorted either in the forward or reverse direction will disturb this relationship as will loss of motor voltage feedback signal, or a loss of firing signals. The fault circuit operates only when alternator voltage is above 50 and when conduction angles are greater than 20 degrees and less than minus 20 degrees in order to prevent false trips. The logic equation is shown in block 572. The flip-flop 584 is connected to receive the output of the logic circuit 572 and when a fault is detected outputs a signal on line 586 to FIG. 10h. Once set it can only be reset using the manual switch on the control panel.

Alternator Volts Feedback Fault

The alternator volts feedback fault 576 is determined by the logic circuit 576 which receives engine speed (W), propel alternator field enable, retard alternator field enable, and alternator voltage (VG) as input signals.

The logic circuit equations are set forth in the block 576. The loss of alternator voltage feedback is detected by monitoring alternator voltage when alternator field is called for by the control system for a minimum length of time (5 seconds) and engine speed is great enough (700 rpm) to produce voltage. A flip-flop 592 is connected to the logic circuit 576 and sets when a fault is detected and output on lead 594 (10h). The flip-flop is reset by a manual switch in the control panel.

Motor 1 Volts Feedback Fault

The motor 1 volts feedback fault 596 is determined by detecting logic circuit 548 which receives the motor 1 volts (VM1), propel field enable, retard field enable, and motor 1 speed (WM1) as input signals.

Loss of motor 1 voltage feedback can be detected by monitoring motor 1 volts when motor field has been called for by the control system for a minimum length of time (5 seconds) and engine speed is great enough (more than 3 mph) to produce voltage. The logic equation is set forth in the circuit block 548. A flip-flop 598 is connected to the logic output to receive a fault signal and output a fault signal on line 600 (FIG. 10h). The flip-flop is reset using a manual switch on the control panel.

Motor Overtemp Warn

The motor overtemp warn 602 is determined by logic circuit 604 which receives motor 1 temperature and motor 2 temperature signals as input signals. The logic equation is set forth in the circuit block 604.

The temperature of each motor 1 and 2 is monitored by amplifying temperature resistive devices 606 and 608. A/D converters 610 and 612 digitize the motor 1 and motor 2 temperature signals, respectively. The A/D converters 610 and 612 are each connected to the motor 1 temperature logic circuit 604. If the temperature of either motor exceeds 365 degrees F. a warning signal will be supplied to the vehicle's cab dashboard on line 614 (FIG. 11b). The logic equation is shown in logic block 604.

Motor Overtemp Fault

The motor overtemperature fault detector 616 also uses the outputs of motor 1 and motor 2 temperature sensor's A/Dd 610 and 612. The A/Ds 610 and 612 are connected to motor overtemp fault logic circuit 618. The logic equation is set forth in the logic circuit block 618. If motor temperature continues to increase after the warning has been given, a temperature of either motor exceeding 400 degrees F. is detected. A flip-flop 620 is connected to the logic circuit 618 and is set by its fault detector signal. A fault signal appears on line 622 (FIG. 10h). The flip-flop is reset by a manual switch located on the control panel.

Ground Fault

The resistors 556 and 558 as previously stated, are connected between the series connected motor armatures and to ground (vehicle frame) to detect any ground fault currents cause by grounds to the truck frame or other points in the power circuit. The resistor 558 is monitored for voltage drop which indicates current flow in the grounding resistor. The monitoring is done through the ISO amplifier 560, digitized in A/D converter 562, changed to an absolute valve in absolute detector and input to logic circuit 566. When fault current exceeds 100 milliamps for 0.2 second the logic circuit 566 outputs a signal. The logic equation is shown in logic block 566. A flip-flop 624 is connected to the logic circuit output to receive the signal and output a fault signal in line 626. The flip-flop can only be reset using the manual switch on the control panel.

MOTOR FIELD CONVERTER CIRCUIT

The motor field converter circuit (FIG. 10g) completes the operation of the alternator 16. The motor field converter 188 (FIG. 10g) consists of two full wave, single phase SCR bridges 650 and 652. Bridge 650 is a positive bridge for forward propel and reverse retarding; bridge 652 is a negative bridge for reverse propel and forward retarding. The alternator winding 126 has its output leads 208 and 210 connected through an isolation transformer 654 to a conductive angle (theta) logic function generator 418 for providing the timing used in determining the zero crossing. A single set of zero crossing signals are used to synchronize firing of both bridges. All four SCRs of each bridge circuit. The resistor 558 is monitored for voltage drop which indicates current flow in the grounding resistor. The monitoring is done through the ISO amplifier 560, digitized in A/D converter 562, changed to an absolute valve in absolute detector and input to logic circuit 566. When fault exceeds 100 milliamps for 0.2 second the logic circuit 566 outputs a signal. The logic equation is shown in logic block 566. A flip-flop 624 is connected to the logic circuit output to receive the signal and output a fault signal in line 626. The flip-flop can only be reset using the manual switch on the control panel.

MOTOR FIELD CONVERTER CIRCUIT

The motor field converter circuit (FIG. 10g) completes the operation of the alternator 16. The motor field converter 188 (FIG. 10g) consists of two full wave, single phase SCR bridges 650 and 652. Bridge 650 is a positive bridge for forward propel and reverse retarding; bride 652 is a negative bridge for reverse propel and forward retarding. The alternator winding 126 has its output leads 208 and 210 connected through an isolation transformer 654 to a conductive angle (theta) logic function generator 418 for providing the timing used in determining the zero crossing. A single set of zero crossing signals are used to synchronize firing of both bridges. All four SCRs of each bridge 650 and 652 are fired simultaneously, but the two are interlocked by a positive converter clamp 656 and a negative converter clamp 658.

Increasing field converter error (FCE) through the positive and negative field converter clamps 656 and 658, respectively, to the positive conductive angle function generator 418 and negative conductive angle function generator 660 causes increasing output of the motor field converter winding 126. The inputs to the positive logic circuit 656 include the field converter error on lead 662 obtained from the FCE output of summer 408 (FIG. 10b) and positive field clamp signal on line 664 (FIG. 10i). If the clamping signal is low the field converter error signal is input to the conductive angle function generator 418 which determines the SCR firing signals. The conductive angle firing signals are connected through a field hardware clamp controlled pulse burst and field hardware clamp logic circuit 666 (FIG. 10g) to the positive SCR bridge 650 when the field hardware clamp 668 (FIG. 12) is low. The field hardware clamp bursts are received on line 664.

Similarly, the negative converter clamp 658 receives the field converter error on line 662 and a negative field clamp signal on line 670 (FIG. 10i) and when the negative converter clamp signal is low, inputs the field converter error signal to the negative conductive angle function generator 660. The negative conductive angle function generator in response to a negative field hardware clamp signal outputs through pulse burst and field hardware clamp logic circuit 672 to the negative SCR bridge 652.

The logic equations of the positive and negative field circuits is described hereinafter in FIG. 10i.

PROTECTIVE CLAMPS

Field Sync Fault

The field synchronization fault 674 is determined by logic circuit 676 which receives the alternator voltage (VG), engine speed (W) and the synchronization signals on lines 314, 322, and 678, respectively, as input signals.

The logic equations are set forth in the logic circuit block. The field synchronization fault circuit detects lack of a synchronization pulse for more than 0.1 second. It operates only when the alternator voltage is greater than 25 and engine rpm is greater than 600. A flip-flop 678 is connected to the logic circuit output. The flip-flop 678 is set by a positive output and outputs pulses on line 680 (FIG. 10h). The flip-flop can only be reset by a manual switch on the control panel.

Motor Field Fault

The motor field fault 682 is determined by logic circuit 684 which receives the field alternating current (IFAC), field direct current (absolute value) and motor current on line 686. The IFAC is developed by an ac rectifying bridge with dc output 688 connected through a transformer to the alternator winding output leads 208 and 210. An A/D converter 690 digitizes the IFAC signal for the motor field fault logic circuit 684. The logic equations are set forth in the circuit block 684. A flip-flop 692 is set by the logic circuit output and outputs a motor field fault signal on line 694.

The absolute motor field current /IF/ is obtained by connecting an iso-amplifier 696 to ac line 212. An A/D converter 698 digitizes the output of the iso-amplifier. An absolute valve circuit 700 provides the absolute valve of the current and outputs it to the logic circuit 684 and on line 702 to FIG. 10h.

Shorted SCR devices in the field bridges can be detected by comparing ac input into the bridge to direct current out of the bridge. A reverse shorted SCR will reduce the output current for a given input current immediately, and a forward shorted SCR will do the same thing the next time the opposite bridge is used. That is, a forward short in the positive bridge will appear as a reverse shorted SCR in the negative bridge. In addition, an open direct current feedback loop will be detected and appear as a shorted SCR. By adding a term that detects direct current outputs that are too high relative to ac input it is also possible to detect an open ac feedback loop.

ACCELERATE FUNCTION LOGIC

The accelerate function calling for propulsion consists of an operator suppled footfeed input accelerator switch 710 (FIG. 10h) connected to the junction of an accelerate switch (AS) inhibiting logic circuit 714 and lead 712 to the inverter 893 of hardware clamps (FIG. 12). The AS logic circuit is inhibited by twenty-three fault detector inputs of which eleven have been previously described and except for the truck interlocks fault 762 are those faults to the right of the figure. The truck interlocks fault 762 signals come from several switches wired in series which indicate other truck systems whose failure should result in overriding the AS signal such as for example, the service brake system. The remaining fault detectors will now be described.

Power Supply Volts Fault

The power supply volts fault logic circuit 715 (FIG. 10h) receives the voltage from the battery 454 (FIG. 10d). If the voltage is greater than 35 v or less than 18 for two seconds, for example, the logic circuit sets a flip-flop 716 which inputs a high signal to inhibit AS logic circuit 714. The power supply volts fault logic equations are contained in the circuit block. The power supply volts fault circuit protects from shorted battery charging alternator regulators that put out voltages capable of damaging the electronic equipment and to keep the drive from driving the truck with low batteries. The flip-flop is reset using a manual switch on the control panel.

Card Interlock

The card interlock fault logic circuit 718 (FIG. 10h) contains the logic equation. The control cabinet 26 (FIG. 1) contains a plurality of printed wiring circuit boards (cards). The card interlock consists of a series of connections through all of the cards that gives a high when all the cards are in place. If the signal is lost, a flip-flop 720 is set to inhibit the AS logic circuit 714. The flip-flop is reset using a manual switch in the control panel.

Polarity Fault

The polarity fault logic circuit 722 (FIG. 10h) is to sense a wrong polarity of the motor voltage. The polarity should be positive in propel and negative in retard. The logic function compares the polarity with the actual control system call for motor voltage only above 3 miles per hour (mph). A fault sets a flip-flop 724 whose output inhibits the AS logic circuit 214. The flip-flop is reset by a manual switch in the control panel. The polarity fault logic equations are contained in the circuit block.

The inputs to this logic circuit 722 are the (VM) negative and positive signals 726 and 728 (FIG. 10b); FORIN 730 and REVIN 732 (FIG. 10h) and 3 mph (FIG. 10b).

Initialization Fault

An initialization fault 734 (FIG. 10h) detected by the initial diagnostic routine of the control computing means (microprocessor) sets a flip-flop 734 whose output inhibits AS logic circuit 714. The flip-flop is reset by a manual switch in the control panel.

Blower Fault

The blower fault logic circuit 736 (FIG. 10h) includes an air pressure switch in the cooling air stream for the electrical equipment which is set to detect lower than normal cooling air pressure at 1600 engine rpm. If the pressure is low for ten seconds a flip-flop 738 is set and its output inhibits the AS logic circuit 714. The flip-flop is reset by a manual switch as the control panel. The blower fault logic equations are contained in the circuit block.

The input signals to the logic circuit 736 are the blower switch 742 and engine rpm (W) 322 (FIG. 10b).

Watchdog Timer Fault

The watchdog timer fault logic (FIG. 10h) is set by any combination of signals 744 from the microprocessor's watchdog timers under which propel is to be stopped. A high signal sets flip-flop 746 whose output inhibits the AS logic circuit 714. The flip-flop is reset using a manual switch in the control panel.

Motor Tach Fail

The motor tach fault logic circuit 748 (FIG. 10h) implements the logic equations shown in the circuit's block. The purpose of this fault detector is to detect the failure of one motor tachometer and prevent driving the truck thereby alleviating the damage which would result if both motors went out. Thus, if the speed of the higher speed motor is present for 10 seconds and no speed is shown for the lower speed motor a flip-flop 750 is set to inhibit the AS logic circuit 714. The flip-flop is reset using a manual switch in the control panel.

Alternator Tach Fail

An alternator tachometer fault logic circuit 752 (FIG. 10h) implements the logic equations shown in the circuit's block. Failure of the alternator tachometer is detected by the presence of alternator voltage and the absence of an engine speed signal. This circuit, when a fault is detected, sets flip-flop 754 whose output inhibits the logic circuit 714. The flip-flop is reset by a manual switch in the control panel.

The inputs to the alternator tachometer fault circuit are the alternator voltage 314 and engine speed 322 (FIG. 10b).

Hoist Interlock

The hoist interlock circuit 756 (FIG. 10h) implements the logic equations shown in the circuit's block. The purpose of the hoist interlock circuit is to prevent a driver from backing over a dump load after hoisting a load from the dump body by failing to shift to forward and to make motion in the forward directions with the body-up difficult by forcing the driver to hold an override switch. It will be apparent to one skilled in the art that if reverse direction has been selected with the body-up, the movement will not occur until the reverse selection is changed to a forward selection. Further, if override is selected by the operator with the body-up only forward direction is possible and it must be selected.

TRANSITION LOGIC

Transitions (FIG. 10i) are made from the forward direction to the reverse direction of travel and from propel to retarding through the computerized control system. In addition, controlling enable functions for alternator field, motor field and armature current are provided by the computerized control center. In all ten basic logic functions of the controller are used to make these direction transitions and to provide for the logic functions as follows.

For Function

The forward (FOR) circuit 770 indicates the direction of travel. The logic equation is contained in the circuit block (FIG. 10i). The FORIN logic circuit 770 outputs a high for forward movement and a low for reverse movement. However, reversing the direction of rotation is limited to speeds below three miles per hour (3 mph).

FOR is set high in flip-flop 772 when forward is selected by the operator controlled input switch 730 and the operator is not calling for retarding.

FOR is set low in flip-flop 772 when the driver selects reverse and is not calling for retarding.

Inputs to the logic circuit 770 for the FOR function are: retard switch RS 384, driver selection of forward (FORIN) 730, 3 mph signal 318 and driver selection reverse (REVIN) 732.

Propel Alternator Field ENABLE

Alternator field enable signals (FIG. 10i) are provided as has been indicated to control the passage of reference signals to the alternator field converter and turn on the alternator field (FIG. 10b). Lack of an enable signal turns off the controlling AND gates and reduce the alternator field to zero.

The propel alternator field enable circuit 774 is to pass propel voltage regulator reference signals to the voltage regulator and turn on the alternator field (FIG. 10b). The logic equations are set forth in the logic block. Any selection of forward or reverse direction will enable the propel alternate field if retarding is not also selected. Leaving the truck in neutral for ten seconds cuts off the propel alternator field unless an electrically driven fan is on.

Inputs to the propel alternator field enable logic circuitry are: driver selection of neutral (NEUTRALIN) 736, retard switch 384, and a call for voltage to operate the electric fan 776.

Retard Alternator Field ENABLE

The retard alternator field enable logic circuit 778 (FIG. 10i) is to pass any retard voltage regulator reference signals to the alternator field converter and turn on the alternator field. Thus, any retard selection will enable the retard alternator field as soon as the propel alternator field is set low. The logic equations are set forth in the logic block.

The inputs to the logic circuit are the retard switch (RS) 384 and a low propel alternator field enable signal.

Field Control Functions

Safe transitions from positive to negative field (FIG. 10i) and from negative to positive field required to change vehicle direction or for changing from propel to retard or retard to propel are provided by a positive field clamp 664, a negative field clamp 670 and zero field. This interlocking prevents short circuits resulting from both positive and negative field converters conducting simultaneously. A transition from positive to negative field is made by first bringing the positive clamp 664 high, monitoring the zero field function 776 to assure true zero field (0 field) and then setting the negative field clamp 670 low.

To control the firing angle of the converters 104, 112 and 124 (FIG. 3) either propel field enable or retard field enable signals pass the respective reference signal to the field converters. If neither field enable signal is high the field is zero.

The field clamp signals are programmed to change only when a transition is called for while the enable signals can turn on and off at any time in response to operator demand for either propel or retard.

Zero Field Function

The zero field function logic circuit 776 (FIG. 10i) operates to monitor decaying motor field and declare it zero if both positive and negative field clamps 664 and 670 stay high for 0.5 seconds after the field has decayed to 10 amperes. The logic equations are contained in the circuit block.

Inputs to the zero field logic circuit are motor field current (IF) 702 (FIG. 10g) positive field clamp, and negative field clamp.

Positive Field Clamp

The positive field clamp 664 (FIG. 10i) contains circuits 782 and 784 to prevent the SCR's in the positive field converter 650 (FIG. 10g) from conducting. To do this, the positive field clamp is set high by flip-flop 786 when the driver selects reverse propulsion or retarding in forward. The positive field clamp is set low by the flip-flop 786 is after zero field has been achieved the driver selects forward propulsion or retarding in reverse. The logic equations are contained in the circuit block.

Inputs to the positive field clamp logic circuit are: the FOR function 762, forward selection by driver (FORIN) 730, reverse selection function by driver (REVIN) 732, retard switch (RS (384, ACCEL FUNCTION 780, and zero field function 776.

Negative Field Clamp

The negative field clamp 670 (FIG. 10i) contains logic circuits 788 and 790 to prevent the SCRs in the negative field converter (652 FIG. 10g) from conducting. The negative field clamp is set high by flip-flop 792 if forward propulsion or retarding in reverse is selected. The negative clamp is set low by flip-flop 792 after zero field has been achieved if reverse propulsion or retarding in forward is selected. The logic equations are set forth in the circuit blocks.

Inputs to the negative field clamp logic circuit 782 are: the FOR function 762, forward (FORIN) selection by driver, reverse (REVIN) selection by driver, retard switch (RS), accleration function (ACCEL FUNCTION) 780 and zero field function 776.

Propel Field Enable

The propel field enable logic circuit 794 (FIG. 10i) is to permit the propel field reference signal to pass to the field converters. The logic equations are contained in the circuit block. Propel field is enabled by the selection of acceleration while also selecting forward while moving forward or reverse while moving in reverse direction.

The inputs for the propel field enable circuit 794 are: acceleration function (ACCEL FUNCTION) 780, forward selection by driver (FORIN) 730, and reverse selection by driver (REVIN) 732.

Retard Field Enable

The retard field enable circuit 796 (FIG. 10i) is to permit the retard field reference signal to pass to the field converter. The logic equation is contained in the circuit block. Retard field in enabled by selection of retarding by the driver or by the automatic speed controls.

The inputs to the retard field enable circuit 796 are reverse switch (RS) and propel field enable.

Armature Enable

The armature enable signals 358 and 362 (FIG. 10i) described next are to permit the respective reference signals to pass to the armature converter and turn on the armature circuit. The lack of an enable signal results in zero armature current.

Propel Armature Enable

The propel armature enable logic circuit 798 (FIG. 10i) is to permit the propel armature reference signal to pass to the armature converter. The logic equations are contained in the circuit block. Propel armature is enabled if the propel field enable is high, the field is 55 greater the ten amperes, and the field clamps and direction of travel are set for propulsion.

The inputs for propel armature logic circuit 798 enable are: propel field enable, motor field IF, positive field clamp, negative field clamp, and forward direction of travel (FOR).

Retard Armature Enable

The retard armature enable logic circuit 800 (FIG. 10i) is to permit the retard armature reference signal to pass to the armature converter. The logic equations are contained in the circuit block. Retard armature is enabled if retard field is enabled, field is greater than ten amperes, the converter clamp is not on, no armature fault exists, the alternator tachometer has not failed, and alternator voltage is high enough to permit commutation of the armature converter SCRs in regenerative operation.

Inputs for the retard armature enable logic circuit 800 are retard field enable, motor field IF, converter clamp, armature fault, alternator tachometer fail, and alternator voltage (VG).

VEHICLE OUTPUT INTERFACE

Referring to FIGS. 11a–11j, the vehicle interface control and warning circuits are preferably solid state circuits. The control and warning circuits are as follows:

Motor Overtemp Warn

The motor overtemperature warning circuit is a low side driver circuit 802 (FIG. 11a) which includes an overtemperature lamp (LED) 804 connected to a source of power (car battery) and a transistor 806 having its collector connected to the lamp, its emitter grounded and its base connected to the temperature monitoring circuit 604 (FIG. 10f).

Ground Fault Warn and Reset

The ground fault warn and reset circuits 808 and 810 (FIG. 11b) include for the ground fault warning, a lamp (LED) 812 connected to a source of power and a transistor 814 having its collector connected to the lamp 812, its emitter grounded and its base connected to the ground fault circuit output 626 (FIG. 10f), and for the reset circuit a manually operated switch 816 located in the vehicle instrument panel. The warning circuit is a low side driver circuit. The switch when closed sends a 24 v battery positive signal to the control panel.

Overspeed Lamp

The overspeed lamp circuit 818 (FIG. 11c) is a low side driver circuit which includes a lamp (LED) 820 connected to the source of power, a transistor 822 having its collector connected to the lamp, its emitter grounded and its base connected to a logic circuit 824. The logic equations are contained in the circuit block. The inputs are the retarding potentiometer voltage on line 826 (FIG. 11c) and the overspeed signal 366.

The overspeed lamp is to warn the driver that the capability of the electric retarding to hold the truck at the preset maximum or driver selected speed has been exceeded. The warning logic turns the lamp on when the overspeed command signal (OSC) has exceeded retarding potentiometer voltage (VRP) for four seconds or more. This is true warning of overspeed as retarding potentiometer voltage represents the maximum retarding field at any given motor speed.

Throttle Solenoid and Retard Lamp Relay

The throttle solenoid and retard lamp relay (FIG. 11d) 828 is a low side driver circuit which includes relay coils 830 and 832 having outputs connected to two or more warning lights (not shown) connected for prominent display on the vehicle. A transistor 834 has its collector connected to the relays, its emitter grounded and its base connected to the retard switch lead 384 (FIG. 10c). Both coils operate off the battery voltage.

System Fault Lamp

The system fault lamp circuit 836 (FIG. 11e) is a low side driver circuit which comprises a lamp 838 connected to a source of power, a transistor 840 having its collector connected to the lamp, its emitter grounded, and its base connected to a logic circuit 842. The logic inputs (FIG. 10h) include the power supply volts fault 712, crowbar 764, card interlock 730, battery boost fault 490, armature fault 586, alternator field fault 429, motor field fault 694, polarity fault 724, motor tach fault 750, alternator tach fail 754, motor overtemp fault 622, initialization fault 736, blower fault 740, watchdog timer fault 746, alternator field sync fault 480, armature sync fault 580, motor field sync fault 680, alternator volts feedback fault 594 and motor 1 volts feedback fault 600.

Low Idle

A high drive side driver circuit operates a solenoid valve to set the engine throttle to low idle for normal propulsion operation. The valve is de-energized to set the engine idle to 1650 rpm minimum for retarding operation. Two embodiment are described as follows.

Low Idle First Embodiment

The low idle first embodiment circuit 844 (FIG. 11f) includes a transistor 846 having its emitter connected to the source of power, its collector connected to a solenoid 848, and its base connected to a logic circuit 850. The logic equations are contained in the circuit block.

In operation the engine is left at retarding idle whenever retarding has been called for until such time as propulsion is called for or vehicle speed drops below three miles per hour. Similarly, once propulsion has been called for idle will stay at normal low levels until retarding is called for. The comparison of field clamp and direction signals provide the logic.

The inputs to the low idle logic circuit 850 are: vehicle speed below 3 mph 318 (FIG. 10b) direction of movement forward (FOR) 762 (FIG. 10i) retard set-up (RS) 384 (FIG. 10c) negative field clamp 670 (FIG. 10i) and positive field clamp 664 (FIG. 10i).

Low Idle Embodiment Two

The low idle, second embodiment, circuit 846 (FIG. 11g) includes a transistor 852 having its emitter connected to a source of power, its collector connected to a solenoid 854 and its base connected to a logic circuit 320. An operator switch 856 is connected to the logic circuit 320. The logic equations are set forth in the logic circuit block. In this embodiment the driver chooses whether to select idle speed in propel above three miles per hour. Retarding always calls for retarding idle, and propel idle below three miles per hour is always low idle.

The inputs to the logic circuit 846 are: truck speed below 3 mph 318 (FIG. 10b), retard set-up 384 (FIG. 10b), and an operator switch input (IDLE SWITCH).

Control Power Contactor Driver

The control power contactor driver circuit 858 (FIG. 11h) is a high side driver circuit that includes a transistor 860 having its emitter connected to the source of power, its collector connected to the junction of a control power switch 862 and contactor coil 864, and its base connected to an inverter 866. The control power contactor driver circuit 858 causes the control power contactor to latch in when speed of the vehicle is above three miles per hour. The control power contactor supplies power to all controls and is energized, for example, by the vehicles batteries.

Auxiliary Relay

The auxiliary relay circuit 868 (FIG. 11i) is a low side driver which includes a relay coil 870 connected to a source of power and to the collector of a transistor 872. The emitter of the transistor 872 is connected to ground and the base is connected to the three miles per hour logic circuit 318 (FIG. 10b).

The auxiliary relay circuit 868 operates to indicate vehicle motion to external circuits.

Speedometer

The speedometer circuit 874 (FIG. 11j) is a driver circuit that includes a grounded speedometer 876 connected to a potentiometer 878. The speedometer 876 is for example, a zero to one millimeter direct current analog meter with a range that includes a calibration capability. The speedometer is driven by a train of direct current pulses corresponding to magnetic pick-up input pulses as the analog movement averages the direct current pulses.

Hardware Clamps

Figure 3:
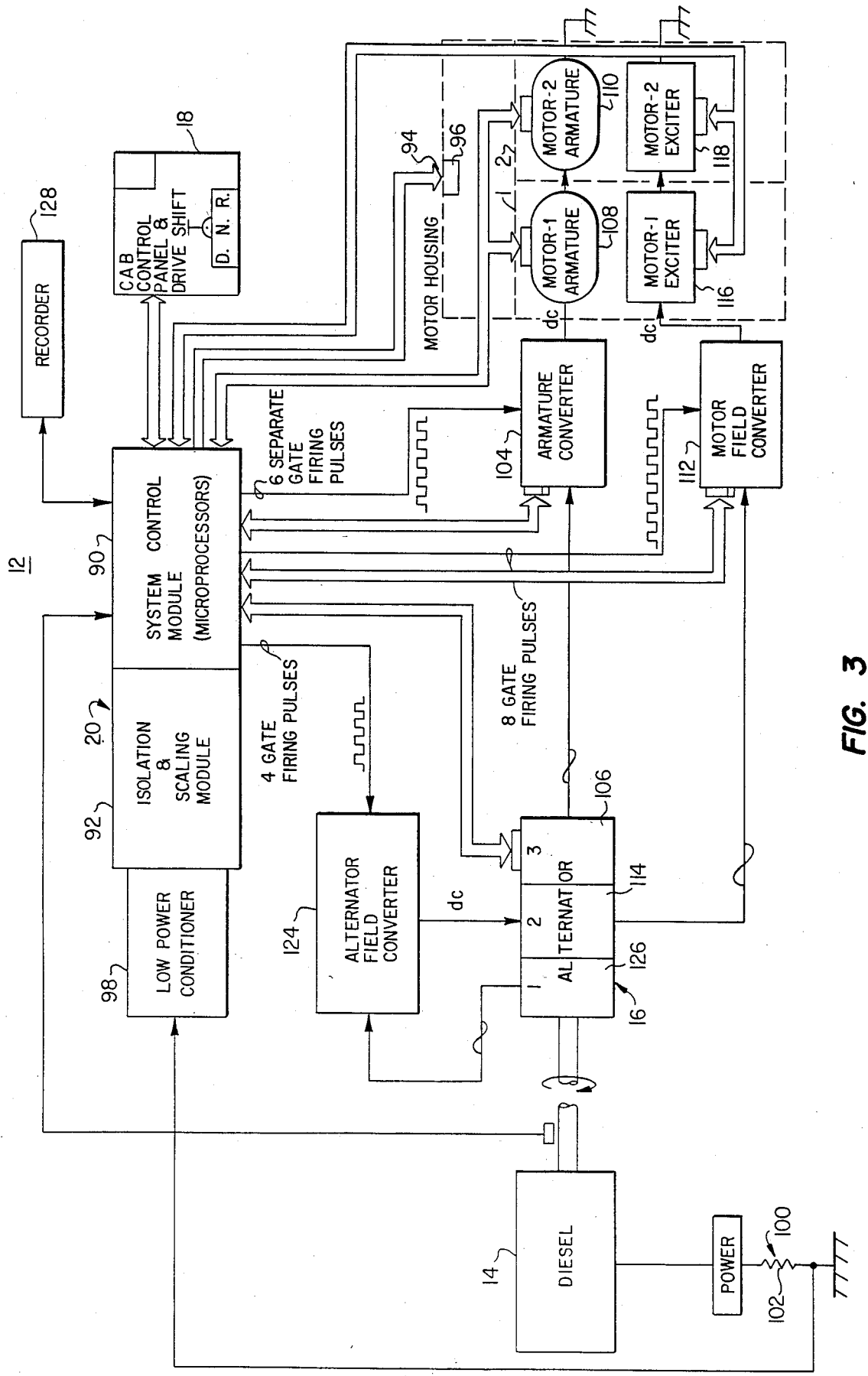
FIG. 3 is a flow diagram of the vehicle's diesel electric traction system and control system.

A field hardware clamp 668 (FIG. 12) and an armature clamp 518 are provided to shut-off conduction of the motor armature and motor field converters 104, and 106 (FIG. 3). These clamps are redundant safety shut-off clamps provided to prevent truck runaway resulting from electronic malfunction.

The two hardware clamps are combined into a logic circuit 890. The inputs to the logic circuit 890 are: operator selected neutral (NEUTRALIN) 736 (FIG. 10i), operator selected acceleration (off the throttle pedal) (AS) 712, operator selected forward (FORIN) 730, operator selected reverse (REVIN), retard switch (RS) (FIG. 10c), and motor voltage positive (VMPOS) 728 (FIG. 10b).

The logic circuit (FIG. 12) incudes an AND gate 892 having input terminals connected through inverters 894 and 896 to the FORIN and REVIN input terminals.

While an AND gate 900 has input terminals connected to the VMPOS input terminal and to the junction of an inverter 902 and the RS input terminal.

The output of AND gate 892 is connected to input terminals of OR gates 904 and 906. The output of AND gate 900 is connected to an input terminal of armature hardware clamp OR gate 908, and the output of the inverter 902 is connected to input terminals of AND gate 910 and field hardware clamp AND gate 912.

The output of AND gate 892 is connected to input terminals of OR gates 904 and 906. The remaining inputs of OR gates 904 and 906 are connected to the NEUTRALIN input terminal 736 and output of inverter 893 connected to AS input terminals 712.

The output of OR gate 904 is to AND gate 910 whose output is connected to the remaining terminal of armature hardware clamp OR gate 908.

While the output of OR gate 906 is to the remaining input terminal of field and hardware clamp AND gate 912.

The logic circuit 890 is connected to bypass the maximum number of circuit devices to the SCRs to reduce the number of devices that can fail and cause the SCRs to stay on.

In operation, the field hardware clamp operates if retarding is not called for and if the operator either selects neutral, or does not select acceleration via throttle operation, or does not select either forward or reverse.

The armature clamp operates if retarding is not called for and if the operator either selects neutral, or does not select acceleration via throttle operation, or does not select either forward or reverse. The armature hardware clamp will also operate if motor voltage is positive and retarding is selected.

To facilitate the reading of the specification in conjunction with the drawings, Table 1 lists the acronyms used, and Table 2 lists the logic equations.

In summary of the operation, the alternator field converter control and the motor field converter control operate in conjunction with the other controls to: regulate the converters to provide stable preselected voltage, current and power; limit the risetime in response to step changes in commanded voltage, power and current to no more than 0.2 seconds with the rotational speed of the prime mover at full power; and provide a steady state error in voltage; current and power of less than 1.0% of full scale.

Although preferred embodiments of this invention have been described it will be apparent to a person skilled in the art that various modifications to the details of construction shown and described may be made without departing from the scope of this invention.

TABLE 1

| | |
|---|---|
| ACE | = Armature converter error |
| ARC | = Automatic retard control |
| ARC | = Automatic retard command |
| AS | = Accelerator switch |
| CC | = Converter clamp |
| EFF | = Alternator efficiency |
| FCE | = Field converter error |
| FL | = Field limit |
| FR | = Field reference |
| ICL | = Commutating current limit |
| IE | = Excitation current, alternator |
| IEAC | = Alternator field alternating current |
| IF | = Field current |
| IFAC | = Field alternating current |
| IM | = Motor current |
| K1 | = Armature resistance to produce a signal VAR |
| K3 | = Maximum motor voltage, retarding |
| K4 | = Ratio of speed slow motor/fast motor |
| LC | = Load control |
| LPL | = Load power limit |
| O | = Field |
| OS | = Overspeed signal |

TABLE 1-continued

| | |
|---|---|
| PAR | = Propel armature reference |
| PCB | = Power cut back signal |
| PCBE | = Power cut back error |
| PE | = Power error |
| RACL | = Retard armature current limit |
| RC | = Retard command |
| RCL | = Retard current limit |
| RFE | = Retard field error |
| RFL | = Retard field limit |
| RFR | = Retard field reference |
| RP | = Retard potentiometer |
| RR | = Retard reference |
| RS | = Retard function or switch |
| RS | = Retard switch |
| SLO | = Speed limit or overspeed signal |
| VAR | = Voltage drop caused by armature resistance |
| VG | = Alternator voltage |
| VGGR | = Retard voltage regulator reference |
| VGR | = Voltage regulator reference |
| VLM | = Motor voltage limit |
| VM | = Motor voltage |
| VM NEG | = Motor voltage negative |
| VME | = Motor voltage error |
| VMG | = Motor counter emf signal |
| VML | = Motor voltage limit |
| VRE | = Voltage regulator error |
| VRP | = Retard potentiometer voltage |
| VT2 | = Tertiary 2 |
| W | = Engine speed |
| WAC | = High signal at low motor speeds |
| WEL | = Engine speed limit |
| WHM | = Faster motor speed |
| WLMA | = Lower motor speed actual |
| WLMD | = Motor differential limit signal |
| WM1 | = Motor 1 speed |
| $\Theta$ | = Conduction angle |
| I FAULT | = Fault convert |

TABLE 2

ARMATURE HARDWARE CLAMP = ( NEUTRALIN + $\overline{AS}$ + $\overline{FORIN}$ * $\overline{REVIN}$ ) * $\overline{RS}$

+ VM POS * RS

FIELD HARDWARE CLAMP = ( NEUTRALIN + $\overline{AS}$ + $\overline{FORIN}$ * $\overline{REVIN}$ ) * $\overline{RS}$

POWER SUPPLY VOLTS FAULT (SET) = VOLTS > 35 * 2 SEC + VOLTS < 18

* 2 SEC

POWER SUPPLY VOLTS FAULT (RESET) = RESET SWITCH

CROWBAR (SET) = IE > 450 * 5 SEC + ( $\overline{\text{PROPEL ALT FIELD ENABLE}}$ *

$\overline{\text{RETARD ALT FIELD ENABLE}}$ * 2 SEC ) * IE > 5

CROWBAR (RESET) = RESET SWITCH

CARD INTERLOCK (SET) = RESET SWITCH

CARD INTERLOCK (RESET) = $\overline{\text{CARD INTERLOCK SIGNAL}}$

BATT BOOST FAULT (SET) = |VOLTS| > 32 + |VOLTS| > 0.5 *

BOOST ENABLE * 10 SEC

BATT BOOST FAULT (RESET) = RESET SWITCH

ARMATURE FAULT (SET) = VG > 50 * ( 0 < -20 + 0 > 20 ) * ( |VM| <

1.1 VG SIN 0 + |VM| > 1.8 VG SIN 0 ) * 1 SEC

ARMATURE FAULT (RESET) = RESET SWITCH

ALT FIELD FAULT (SET) = ( IEAC > 20 * IEAC > 1.2 IE + IE > 20 *

IEAC < 0.8 IE ) * 2 SEC

TABLE 2-continued

ALT FIELD FAULT (RESET) = RESET SWITCH

MOTOR FIELD FAULT (SET) = ( IFAC > 20 * IFAC > 1.2 |IF| + |IF| >

20 * IFAC < 0.8 |IF| ) * 2 SEC + IM > 1100 * |IF| < 250 * 4

SEC

MOTOR FIELD FAULT (RESET) = RESET SWITCH

POLARITY FAULT (SET) = ( VM POS * RS + VM NEG * $\overline{RS}$ * ACCEL

FUNCTION * ( FORIN + REVIN )) * 3MPH * 5 SEC

POLARITY FAULT (RESET) = RESET SWITCH

ALT FIELD SYNC FAULT (SET) = VG > 25 * W > 600 * $\overline{SYNC}$ * 0.1 SEC

ALT FIELD SYNC FAULT (RESET) = RESET SWITCH

ARMATURE SYNC FAULT (SET) = VG > 25 * W > 600 * ( $\overline{SYNC\ \#1}$ * 0.1

SEC + $\overline{SYNC\ \#2}$ * 0.1 SEC + $\overline{SYNC\ \#3}$ * 0.1 SEC + $\overline{SYNC\ \#4}$ * 0.1

SEC + $\overline{SYNC\ \#5}$ * 0.1 SEC * $\overline{SYNC\ \#6}$ * 0.1 SEC )

ARMATURE SYNC FAULT (RESET) = RESET SWITCH

FIELD SYNC FAULT (SET) = VG > 25 * W > 600 * $\overline{SYNC}$ * 0.1 SEC

FIELD SYNC FAULT (RESET) = RESET SWITCH

ALT VOLTS FBK FAULT (SET) = W > 700 * ( PROPEL ALT FIELD ENABLE

+ RETARD ALT FIELD ENABLE ) * 5 SEC * VG < 25

ALT VOLTS FBK FAULT (RESET) = RESET SWITCH

MOTOR 1 VOLTS FBK FAULT (SET) = WM1 > 3MPH * (PROPEL FIELD

ENABLE + RETARD FIELD ENABLE ) * 5 SEC * |VM| < 25

MOTOR 1 VOLTS FBK FAULT (RESET) = RESET SWITCH

GROUND FAULT (SET) = IFAULT > 100ma * 0.2 SEC

GROUND FAULT (RESET) = DRIVERS RESET SWITCH

PRIME MOVER SYSTEM FAULT LAMP OFF

INITIALIZATION FAULT (SET) = TO BE DEFINED BY MICRO DESIGNER

INITIALIZATION FAULT (RESET) = RESET SWITCH

MOTOR OVERTEMP FAULT (SET) = MOTOR 1 TEMP > 400 + MOTOR 2 TEMP >

400

MOTOR OVERTEMP FAULT (RESET) = RESET SWITCH

MOTOR OVERTEMP WARN = MOTOR 1 TEMP > 365 + MOTOR 2 TEMP > 365

BLOWER FAULT (SET) = $\overline{BLOWER\ SWITCH}$ * W > 1600 * 10 SEC

BLOWER FAULT (RESET) = RESET SWITCH

WATCHDOG TIMER FAULT (SET) = WATCHDOG TIMER

WATCHDOG TIMER FAULT (RESET) = RESET SWITCH

MOTOR TACH FAIL (SET) = WHM * $\overline{WLMA}$ * 10 SEC

MOTOR TACH FAIL (RESET) = RESET SWITCH

ALT TACH FAIL (SET) = VG > 50 * $\overline{W}$ * 5 SEC

ALT TACH FAIL (RESET) = RESET SWITCH

TABLE 2-continued

WAC = WHM < PRESET VALUE

CONVERTER CLAMP = RS * $\overline{\text{WAC}}$

HOIST INTERLOCK = BODY UP * REVIN + BODY UP * $\overline{\text{OVERRIDE}}$ + ( HOIST INTERLOCK * REVIN )

PROPEL ALT FIELD ENABLE = $\overline{\text{NEUTRALIN * 10 SEC * RS}}$ + FAN * $\overline{\text{RS}}$ RETARD ALT FIELD ENABLE = RS * $\overline{\text{PROPEL ALT FIELD ENABLE}}$

BATT BOOST ENABLE = ( PROPEL ALT FIELD ENABLE + RS ) * W > 500

FOR (SET) = $\overline{\text{RS}}$ * FORIN * $\overline{\text{3MPH}}$

FOR (RESET) = $\overline{\text{RS}}$ * REVIN * $\overline{\text{3MPH}}$

0FIELD = IF < 10 * POS FIELD CLAMP * NEG FIELD CLAMP * 0.5 SEC

PROPEL ARMATURE ENABLE = PROPEL FIELD ENABLE * |IF| > 10 *

( $\overline{\text{POSITIVE FIELD CLAMP}}$ * FOR + $\overline{\text{NEGATIVE FIELD CLAMP}}$ * $\overline{\text{FOR}}$ )

RETARD ARMATURE ENABLE = RETARD FIELD ENABLE * |IF| > 10 *

$\overline{\text{CONVERTER CLAMP}}$ * $\overline{\text{ARMATURE FAULT}}$ * $\overline{\text{ALT TACH FAIL}}$ * VG >

( 0.74 |VM| + 50 )

PROPEL FIELD ENABLE = ACCEL FUNCTION * $\overline{\text{RS}}$ * ( FORIN * FOR +

REVIN * $\overline{\text{FOR}}$ ) * $\overline{\text{RETARD FIELD ENABLE}}$

RETARD FIELD ENABLE = RS * $\overline{\text{PROPEL FIELD ENABLE}}$

NEGATIVE FIELD CLAMP (SET) = FOR * FORIN * ACCEL FUNCTION * $\overline{\text{RS}}$ +

$\overline{\text{FOR}}$ * RS

NEGATIVE FIELD CLAMP (RESET) = $\overline{\text{FOR}}$ * REVIN * ACCEL FUNCTION * $\overline{\text{RS}}$

* 0FIELD + FOR * RS * 0FIELD

POSITIVE FIELD CLAMP (SET) = $\overline{\text{FOR}}$ * REVIN * ACCEL FUNCTION * $\overline{\text{RS}}$ +

FOR * RS

POSITIVE FIELD CLAMP (RESET) = FOR * FORIN * ACCEL FUNCTION * $\overline{\text{RS}}$

* 0FIELD + $\overline{\text{FOR}}$ * RS * 0FIELD

ACCEL FUNCTION = AS * $\overline{\text{GROUND FAULT}}$ * TRUCK INTERLOCKS * $\overline{\text{HOIST}}$ $\overline{\text{INTERLOCK}}$ * $\overline{\text{POWER SUPPLY VOLTS FAULT}}$ * $\overline{\text{CROWBAR}}$ * CARD INTERLOCK * $\overline{\text{BATT BOOST FAULT}}$ * $\overline{\text{ARMATURE FAULT}}$ * $\overline{\text{ALT FIELD}}$ $\overline{\text{FAULT}}$ * $\overline{\text{MOTOR FILED FAULT}}$ * $\overline{\text{POLARITY FAULT}}$ * $\overline{\text{MOTOR TACH FAIL}}$

* $\overline{\text{ALT TACH FAIL}}$ * $\overline{\text{MOTOR OVERTEMP FAULT}}$ * $\overline{\text{INITIALIZATION}}$ $\overline{\text{FAULT}}$ * $\overline{\text{BLOWER FAULT}}$ * $\overline{\text{WATCHDOG TIMER FAULT}}$ * $\overline{\text{ALT FIELD SYNC}}$ TABLE 2-continued $\overline{\text{FAULT}} * \overline{\text{ARMATURE SYNC FAULT}} * \overline{\text{FIELD SYNC FAULT}} * \overline{\text{ALT VOLTS}}$ $\overline{\text{FBK FAULT}} * \overline{\text{MOTOR 1 VOLTS FBK FAULT}}$

THROTTLE SOLENOID = RS

RETARD LIGHT RELAY = RS

LO IDLE (EXISTING) = ( $\overline{\text{3MPH}}$ + IDLE SWITCH ) * $\overline{\text{RS}}$ LO IDLE (PROPOSED) = ( $\overline{\text{3MPH}}$ + NEGATIVE FIELD CLAMP * FOR +

POSITIVE FIELD CLAMP * $\overline{\text{FOR}}$ ) * $\overline{\text{RS}}$

CONTROL POWER LATCH = 3MPH

AUXILIARY RELAY = 3MPH

What is claimed is:

1. An off-road, heavy-duty, haulage vehicle comprising:
   (a) a vehicle having an electrical motor driven wheel means including a voltage monitoring means for continuously monitoring the motor voltage; and
   (b) a generator means for producing electrical power, said generator means including a power control means responsive to the motor voltage for producing a tracking voltage which tracks the motor voltage always at a higher increment up to the maximum allowable voltage output of the generator means.

2. An off-road, heavy-duty, haulage vehicle comprising:
   (a) a vehicle having an electrical motor driven wheel means including a voltage monitoring means for continuously monitoring the motor voltage; and
   (b) a generator means for producing electrical power, said generator means including a computerized power control means responsive to the motor voltage for producing a tracking voltage which tracks the motor voltage always at a computer determined higher increment up to the maximum allowable voltage output of the generator means.

3. An off-road, heavy-duty, haulage vehicle according to claim 2 wherein the computerized control means includes means for adding to the motor voltage a constant voltage representing a normal difference between the motor voltage and the voltage of the generator means for producing a normal voltage signal, a first comparator means for comparing the normal voltage signal of the generator means to a preselected minimum desired voltage for the generator means and selecting the higher signal as a minimum voltage for the generator means, and a second comparator means for comparing the output of the first comparator to a selected maximum allowable voltage for the generator and selecting the lower value for controlling the generator means for producing the motor tracking voltage.

4. An off-road, heavy duty, haulage vehicle comprising:
   (a) a vehicle having drive wheels, and motors responsive to electric power for driving the drive wheels, the motors having armatures and motor fields; and
   (b) a prime mover electric traction drive system including a combustion engine, an alternator means operatively connected to the combustion engine for producing electrical energy, a control center including an armature converter control means responsive to motor operation outputs for producing armature converter control signals, an armature converter operatively connected to the alternator means and motor armatures, said armature converter responsive to the electrical energy and control signals for producing forward motion and reversing and regulating the flow of energy from the motors for selectively producing regeneration power into the combustion engine whereby low speed retarding is provided, a motor voltage monitoring means for continuously monitoring the motor voltage, and a power control means responsive to the motor voltages for producing a tracking voltage which tracks the motor voltage as a higher increment up to a maximum allowable voltage.

5. An off-road, heavy-duty, haulage vehicle according to claim 4 further including a motor field converter operatively connected to the alternator means and motor fields, said field converter responsive to the electrical energy and control means for controlling field excitation, said motor field converter comprising positive and negative fullwave, single phase SCR bridges, positive and negative clamps operatively connected to a corresponding positive and negative bridge for interlocking the bridges and a SCR firing control means for synchronously firing the SCRs of both bridges simultaneously, whereby the positive bridge controls forward propel and reverse retarding and the negative bridge controls reverse propel and forward retarding.

6. An off-road, heavy-duty, haulage vehicle according to claim 5 further including an alternator field converter operatively connected to the alternator means, said alternator field converter responsive to the output of the alternator means for producing exciter current whereby the alternator means is self exciting.

7. An off-road, heavy-duty haulage vehicle comprising:
   (a) a support frame;
   (b) front wheels and motorized rear wheels operatively connected to the support frame, each motor of said motorized rear wheel having an armature and a field exciter means; and
   (c) a prime mover electric traction drive system operatively connected to the support frame and motorized rear wheels, said prime mover electric traction drive system including a prime mover, an alternator having multiple windings operatively connected to the prime mover for producing a plurality of ac power sources, a control means including an alternator voltage control means operatively connected to the motor for receiving motor feedback voltages and adding a preselected voltage increment for providing an operating voltage other than a constant maximum voltage level to the alternator for controlling the operating voltages, an armature converter and a field converter responsive to the ac alternator for producing dc power, respectively, for the armature and field exciter of the motorized rear wheel motor whereby the armature and field currents closely track each other without the field always lagging armature current.

8. An off-road, heavy-duty, haulage vehicle according to claim 7 further including a cab supported by the support frame, said cab housing a steering means operatively connected to the front wheels for steering the vehicle during motion, and an accelerator pedal and a retard pedal and a forward/neutral/reverse control switching means operatively connected to the alternator voltage control means for determining the speed of the vehicle and for controlling the direction of motion.

9. An off-road, heavy-duty, haulage vehicle according to claim 7 further including a deck means for supporting the cab above the prime mover electric traction drive system in line with the rear wheel for providing a clear view of the rear wheel, a control means cabinet located adjacent to the cab for housing the control means, and means including a canopy extending above the deck for protecting the cab and control means cabinet.

10. An off-road, heavy-duty, haulage vehicle according to claim 7 wherein the field converter includes a high power semiconductor circuit having double single phase controlled rectifying means having a positive bank of SCRs for use in forward propel and reverse retarding and a negative bank of SCRs for use in reverse propel and forward retarding, the positive and negative banks of SCRs being interlocked to prevent short circuit operation should both conduct simultaneously.

11. An off-road, heavy-duty, haulage vehicle according to claim 10 wherein the alternator includes a 3 phase armature winding and the armature converter includes a phase controlled high power semiconductor circuit having an SCR bridge whereby when in the retard mode under a preselected speed value power flows from the motor armature through the armature converter to the alternator armature winding for motoring the prime mover to retard the vehicle.

12. An off-road, heavy-duty, haulage vehicle according to claim 7 further including a high power semiconductor alternator field converter responsive to an ac output of the alternator for producing dc for self excitation of the alternator.

13. An off-road, heavy-duty, haulage vehicle according to claim 7 wherein the control means includes a plurality of sensors responsive to the prime mover electric traction drive system components for producing status information signals, a decision making means responsive to the sensor status information signals for producing decision making information signals for controlling the prime mover electric traction drive system component's actions.

14. An off-road, heavy-duty, haulage vehicle according to claim 13 wherein the decision making means is a digital computing means and further including an analog to digital isolation and scaling means operatively connected to the decision making means and responsive to the analog output of the high power semiconductor circuits for digitizing the analog output for the digital computing means.

15. An off-road, heavy-duty, haulage vehicle according to claim 14 further including a ground fault detection means responsive to the resistance between the high power circuits and the support frame for detecting a less than a minimum acceptable resistance, and a low power conditioner means operatively connected to the isolation and scaling means for conditioning the low level leakage current for the isolation and scaling means.

16. An off-road, heavy-duty, haulage vehicle according to claim 13 wherein the plurality of sensors responsive to the prime mover electric traction drive system components include analog sensors selected from the group consisting of the: altnerator voltage, alternator dc and ac field currents, motor voltage, motor armature current, motor dc and ac motor field currents, speed limit potentiometer, preset speed limit potentiometer, retard control potentiometer, battery voltage, battery boost voltage, and motor temperature.

17. An off-road, heavy-duty, haulage vehicle according to claim 13 wherein the plurality of sensors responsive to the prime mover electric traction drive system components include magnetic pick-up devices with high level output for speed inputs including engine speed and motor speed.

18. An off-road, heavy-duty, haulage vehicle according to claim 13 wherein the plurality of sensors responsive to the prime mover electric traction drive system components include timing means for providing timing inputs for detecting zero crossings for SCR firing synchronization selected from the group consisting of armature phases A, B and C positive and negative, motor field positive and negative and alternator field positive and negative.

19. An off-road, heavy-duty, haulage vehicle according to claim 13 wherein the decision making means is a digital computer responsive to selected sensor inputs for providing digital signals selected from the group consisting of: battery boost trigger, ground fault warning, motor over temperature warning, system fault warning, throttle solenoid and retard lamp relay drive, low idle solenoid drive, control power latch, auxilary 3 mph relay drive, motor overspeed warning, armature hardware clamp and field hardware clamp.

20. An off-road, heavy-duty, haulage vehicle according to claim 13 further including a digital to analog converter responsive to the output of the decision making means for producing analog outputs indicative of the supply voltage for retarding potentiometer and 0-1 millimeter speedometer signal.

21. An off-road, heavy-duty, haulage vehicle according to claim 13 wherein the decision making means is responsive to sensor inputs for producing pulse train signals for firing the SCRs selected from the control group consisting of armature converter SCRs 1-6, positive and negative motor field converter SCRs and alternator field SCRs.

22. An off-road, heavy-duty, haulage vehicle according to claim 13 wherein the plurality of sensors for the control means includes a temperature sensor means positioned adjacent to the motor of the motorized rear wheels for detecting the motor temperature.

23. An off-road, heavy-duty, haulage vehicle according to claim 13 wherein the decision making means is a computer means and further including a diagnostic means including a display means having warning lights responsive to the computer means for providing warning, fault, input, logic, and output functions.

24. An off-road, heavy-duty, haulage vehicle according to claim 23 wherein the decision making means further includes a test means operatively connected to the computer means for selectively exercising all inputs including switch, speed signal, analog, and combustion thereof by switch selection.

25. An off-road, heavy-duty, haulage vehicle according to claim 24 wherein the test means includes power sources including an oscillator circuit for speed signals, adjustable direct current voltage for analog signals and 24 volts for switch inputs.

26. An off-road, heavy-duty, haulage vehicle according to claim 23 further including a recorder means responsive to the computer means for recording at sample frequency for a first preselected time and every second for a second preselected time variables selected from the group consisting of: engine speed, total motor armature voltage, motor armature current, calculated alternator input power, speed of each motor, voltage of higher voltage motor, motor field current, alternator field current, alternator voltage, volts across boost resistor, and motor temperatures.

27. An off-road, heavy-duty, haulage vehicle according to claim 23 further including a recorder means responsive to the computer means for recording at sample frequency for a preselected last time the status of selected input, logic, output and warning functions.

28. An off-road, heavy-duty, haulage vehicle according to claim 23 further including a recorder means responsive to the computer means for recording the highest value since last interrogation of analog functions selected from the group consisting of: engine speed, total motor armature voltage, motor armature current, calculated alternator input power, speed of the motors, voltage of higher voltage motor, motor field current, alternator field current and voltage, volts across boost resistor and motor temperatures.

29. An off-road, heavy-duty, haulage vehicle according to claim 23 further including a recorder means responsive to the computer means for recording the count of digital functions since the last interrogation including warning, fault, input logic throttle solenoid and low idle solenoid functions.

30. An off-road, heavy-duty, haulage vehicle according to claim 23 further including a recorder means responsive to the computer means for stopping recording any time a fault function is detected.

31. An off-road, heavy-duty, haulage vehicle according to claim 23 further including a recorder means responsive to the computer means for recording maintenance and repair information, said recorder having a first serial link for permitting interrogation of recorded data by an off board device for analysis and permanent recording and a second serial link for permitting hand interrogation of the recorded data by an on board display.

32. An off-road, heavy-duty haulage vehicle according to claim 31, wherein the alternator means includes a three phase armature for producing three phase ac power, a first tertiary stator winding for producing power to excite the motorized wheel electric motor; and said converter means including an alternator converter including a single phase full rectifying bridge operatively connected to the alternator first stator winding for producing dc power, and a coil responsive to the dc output for self-exciting the the alternator armature winding; dual single phase full rectifying bridges operatively connected to the alternator second stator winding for selectively exciting the motorized wheels electric drive motor field coils in the forward propel/reverse retard modes, and in the reverse propel/forward retard mode; and a three-phase, full wave rectifier bridge operatively connected to the motorized wheel electric motor for receiving power from the motor acting as a generator during retard and to the alternator three-phase armature for motoring the internal combustion engine and providing a retard without contactors at low speed.

33. An off-road, heavy-duty haulage vehicle according to claim 32 wherein the full wave rectifier bridges comprise silicon controlled rectifiers.

34. An off-road, heavy-duty haulage vehicle according to claim 33 further including contact means operatively connected to gates of the silicon controlled rectifiers of the full wave rectifiers for controlling firing.

35. An off-road, heavy duty, haulage vehicle according to claim 7, wherein said alternator further includes an alternator field converter for rectifying alternating current into direct current for self-excitation of the alternator and wherein the armature and field converters are responsive to the electrical power output of the alternator for selectively driving the motorized wheels in forward propel and reverse retard operational modes and reverse propel and forward retard modes, and responsive to power generated by the electric motors when acting as generators in the retard mode for producing in the prime mover retarding forces at speeds below a preselected speed.

* * * * *